United States Patent
Takahashi et al.

(10) Patent No.: US 8,603,268 B2
(45) Date of Patent: Dec. 10, 2013

(54) TITANIUM MATERIAL FOR SOLID POLYMER FUEL CELL SEPARATOR HAVING LOW CONTACT RESISTANCE AND METHOD OF PRODUCTION OF SAME

(75) Inventors: Kazuhiro Takahashi, Tokyo (JP); Kiyonori Tokuno, Tokyo (JP); Hiroshi Kihira, Tokyo (JP); Koki Tanaka, Tokyo (JP); Michio Kaneko, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 264 days.

(21) Appl. No.: 12/998,214

(22) PCT Filed: Jul. 30, 2009

(86) PCT No.: PCT/JP2009/063905
§ 371 (c)(1),
(2), (4) Date: Mar. 25, 2011

(87) PCT Pub. No.: WO2010/038544
PCT Pub. Date: Apr. 8, 2010

(65) Prior Publication Data
US 2011/0177430 A1    Jul. 21, 2011

(30) Foreign Application Priority Data
Sep. 30, 2008    (JP) ................ 2008-253328

(51) Int. Cl.
*C22F 1/18* (2006.01)
*H01M 8/10* (2006.01)

(52) U.S. Cl.
USPC ........................... 148/671; 429/479

(58) Field of Classification Search
USPC ........ 148/243, 671; 432/23, 18; 429/485, 479
See application file for complete search history.

(56) References Cited

U.S. PATENT DOCUMENTS
2009/0130300 A1    5/2009 Suzuki et al.

FOREIGN PATENT DOCUMENTS

| CN | 1535487 | 10/2004 |
|---|---|---|
| EP | 1990855 | 11/2008 |
| JP | 2001-006713 | 1/2001 |
| JP | 2001-357862 | 12/2001 |
| JP | 2007-059375 | 3/2007 |
| JP | 2007-234244 | 9/2007 |
| JP | 2008-153082 | 7/2008 |

(Continued)

OTHER PUBLICATIONS

International Search Report published Apr. 8, 2010 issued in corresponding PCT Application No. PCT/JP2009/063905.

(Continued)

*Primary Examiner* — Jessee Roe
(74) *Attorney, Agent, or Firm* — Kenyon & Kenyon LLP

(57) ABSTRACT

A titanium material for a solid polymer fuel cell separator having a low contact resistance and a method of production of the same, the titanium material having at its surface a surface layer structure in which particles of a Ti compound containing either C or N are dispersed, the particles of Ti compound being covered by titanium oxide and/or metal Ti, characterized in that, when analyzed from the surface by XPS, a Ti2p spectrum of $TiO_2$ is detected, further, at a Ti2p spectral energy range of TiO and/or a Ti2p spectral energy range of metal Ti, a Ti maximum detection peak height is at least 3 times the standard deviations of the background at the respective spectral energy ranges, and at a C1s spectral energy range and N1s spectral energy range, a maximum detection peak height is less than 3 times the standard deviations of the background at the respective spectral energy ranges of C1s and N1s, are provided.

13 Claims, 6 Drawing Sheets

SURFACE SIDE OF TITANIUM MATERIAL

(56) References Cited

FOREIGN PATENT DOCUMENTS

| | | |
|---|---|---|
| JP | 2008-176988 | 7/2008 |
| JP | 2008-210773 | 9/2008 |
| JP | 2009-097060 | 5/2009 |
| JP | 2009-123528 | 6/2009 |

OTHER PUBLICATIONS

Chinese Office Action dated Jan. 4, 2013 issued in corresponding Chinese Application No. 200980138735.8 (with English Translation).

SURFACE SIDE OF TITANIUM MATERIAL

TITANIUM MATERIAL FOR SOLID POLYMER FUEL CELL SEPARATOR HAVING LOW CONTACT RESISTANCE AND METHOD OF PRODUCTION OF SAME

This application is a national stage application of International Application No. PCT/JP2009/063905, filed 30 Jul. 2009, which claims priority to Japanese Application No. 2008-253328, filed 30 Sep. 2008, which is incorporated by reference in its entirety.

TECHNICAL FIELD

The present invention relates to a titanium material for a solid polymer fuel cell separator low in contact resistance which may be used for automobiles and small-sized power generation systems etc. and a method of production of the same. In particular, it relates to a titanium material for a solid polymer fuel cell separator which has a low contact resistance even without distributing or depositing an Au, Ag, Pt, Pd, Ru, Rh, Ir, or Os precious metal, an alloy containing a precious metal, or $Cr_2N$, $CrSi_2$, VB, $V_8C_7$, VN, TaN, TaC, WC, WNb, or other electroconductive compound containing a metal element other than Ti on the surface of the titanium material and to a method of production of the same.

BACKGROUND ART

A solid polymer fuel cell is a system for taking out electric power by using, as a fuel, pure hydrogen, hydrogen gas obtained by modifying alcohol, etc. and electrochemically controlling the reaction between the hydrogen and the oxygen in the air. It enables a compact configuration to be achieved. Development work is underway for application for electric vehicles etc.

The configuration of a typical solid polymer fuel cell is shown in FIG. 1. The basic principle of a solid polymer fuel cell 1 is as follows: That is, in a solid polymer fuel cell 1, the fuel of hydrogen gas ($H_2$) 8 is supplied from the anode side and passes through the gas diffusion layer of the carbon paper 4 and catalyst electrode part 3 to form hydrogen ions ($H^+$) which in turn pass through the electrolyte of the solid polymer membrane 2 whereby, at the cathode side catalyst electrode part 3, hydrogen ions ($H^+$) and oxygen ($O_2$) in the air 9 supplied from the cathode side undergo an oxidation reaction ($2H^+ + 2e^- + 1/2O_2 \rightarrow H_2O$) and water ($H_2O$) is formed. At the time of this oxidation reaction, the electrons 10 formed at the anode side catalyst electrode part 3 flow through the carbon paper 4 from the anode side separator 6 to the cathode side separator 7 whereby current and voltage is generated across the electrodes.

The solid polymer membrane 2 has an electrolyte with a strong acidity fixed in the membrane and functions as an electrolyte passing hydrogen ions ($H^+$) by control of the dew point inside the cell.

The component member separator 5 of the solid polymer fuel cell 1 has the role of separating the two types of reaction gases, that is, the cathode side air 9 and the anode side hydrogen gas 8, and providing flow paths for supplying these reaction gases and the role of discharging the water produced by the reaction from the cathode side. Further, in general, the solid polymer fuel cell 1 uses a solid polymer member made of an electrolyte exhibiting a strong acidity. Due to the reaction, it operates at a temperature of about 150° C. or less and generates water. For this reason, the separator 5 for a solid polymer fuel cell is required to have, as material properties, corrosion resistance and durability and is required to have good electroconductivity for efficient conduction of current through the carbon paper 4 and low contact resistance with carbon paper.

In the past, as the material for the separator for a solid polymer fuel cell, much use has been made of carbon-based materials. However, separators made of carbon-based materials cannot be made thin due to problems of brittleness and therefore obstruct increased compactness. In recent years, breakage-resistant separators made of carbon-based materials have also been developed, but they are expensive in cost, so are disadvantageous economically.

On the other hand, separators using metal materials are free from problems of brittleness compared with carbon-based materials, so in particular enable increased compactness and lower cost of solid polymer fuel cell systems. Therefore, many separators using titanium and other metal materials superior in corrosion resistance have been developed and proposed. However, separators made of pure titanium or titanium alloy become larger in contact resistance with the carbon paper due to the passivation film formed on the surfaces during power generation, so had the problem of greatly reducing the energy efficiency of the fuel cells.

For this reason, numerous methods for reducing the contact resistance between member surfaces and carbon paper have been proposed for titanium-made separators in the past.

For example, separator materials for fuel cell use which cause a precious metal or precious metal alloy to deposit on the surface of a titanium material or form a film there by the sputtering method or PVD method so as to lower the contact resistance with the carbon paper (that is, to raise the electroconductivity) have been proposed (see PLTs 1, 2, 3, and 4). Further, a titanium material for a fuel cell which uses a titanium alloy to which a precious metal has been added and causes the precious metal element to precipitate on the titanium alloy surface so as to lower the contact resistance has also been proposed (see PLT 5).

However, these methods require the formation of expensive precious metal layers or precious metal particles on the surface of the titanium material, so have the problem of increasing the manufacturing costs of the separators.

On the other hand, to reduce the contact resistance between the surface of the titanium material of a separator and carbon paper without using an expensive precious metal, the method of shot blasting etc. $Cr_2N$, $CrSi_2$, VB, $V_8C_7$, VN, TaN, TaC, WC, WNb, or other electroconductive compound particles containing metal elements other than Ti on to the titanium material surface has also been proposed (see PLT 4). However, at the time of use of the fuel cell, metal ions are eluted from these electroconductive compounds to the MEA (assembly of the solid polymer type electrolyte member and electrode) thereby causing the electromotive force to fall and the power generation ability to otherwise decline in some cases. Further, from the viewpoint of recycling the separator material, when remelting a titanium material on which electroconductive compound particles are deposited in large amounts, the elements contained in the electroconductive compound will affect the mechanical properties of the titanium and end up impairing the workability etc.

PLT 6, while not limited to a titanium material for a separator, discloses to electrolytically pickle a titanium material on the surface of which a layer containing titanium carbides and/or nitrides is formed in an acidic aqueous solution or a neutral aqueous solution containing an acidifying agent and to use an acidic aqueous solution comprised of a nitric acid aqueous solution (1 to 10 wt %) and an acidifying agent comprised of $Cr^{6+}$ ions. Note that, this electrolytic pickling is based on electrolysis using titanium as an anode (anodic electrolysis). However, the contact resistance before and after power generation, important as a required property of a separator, is not described.

In PLT 6, ESCA (same method as X-ray photoelectron spectroscopy (XPS)) at the surface of Example 1 is shown in FIG. 2. Except for contamination, no clear peak other than $TiO_2$ (near 459 eV) is detected. That is, no peaks are detected at the spectral energy ranges showing the presence of TiO and metal Ti (respectively 454.2 to 455.1 ev and 453.7 to 453.9 eV).

CITATION LIST

Patent Literature

PLT 1: Japanese Patent Publication (A) No. 2001-6713
PLT 2: Japanese Patent Publication (A) No. 2008-153082
PLT 3: Japanese Patent Publication (A) No. 2008-210773
PLT 4: Japanese Patent Publication (A) No. 2008-176988
PLT 5: Japanese Patent Publication (A) No. 2007-59375
PLT 6: Japanese Patent Publication (A) No. 2009-97060

SUMMARY OF INVENTION

Technical Problem

As explained above, the titanium materials for separator use of PLTs 1 to 5 reduce the contact resistance by distributing or depositing Au, Ag, Pt, Pd, Ru, Rh, Ir, or Os precious metals, alloys containing precious metals, electroconductive compounds ($Cr_2N$, $CrSi_2$, VB, $V_8C_7$, VN, TaN, TaC, WC, WNb, etc.), etc. on the surfaces of the titanium materials. Therefore, the manufacturing costs end up increasing due to the use of precious metals and, further, when using electroconductive compounds including metal elements other than Ti, the power generation ability drops due to eluted metal ions and there are problems in recyclability.

On the other hand, a titanium material without an Au, Ag, Pt, Pd, Ru, Rh, Ir, or Os precious metal, alloy containing a precious metal, or electroconductive compound ($Cr_2N$, $CrSi_2$, VB, $V_8C_7$, VN, TaN, TaC, WC, WNb, etc.) on its surface has the problems that it is high in initial contact resistance and, further, during power generation, titanium ions eluted from the titanium surface precipitate as titanium oxide on the surface and end up further increasing the contact resistance. That is, there is the problem that even if suppressing the elution of titanium ions during power generation, there is no precious metal or electroconductive compound on the surface, so the initial contact resistance itself is high.

Therefore, the present invention, in view of the above state of the prior art, has as its object the provision of a titanium material for a solid polymer fuel cell separator having a low contact resistance which is low in initial contact resistance and can suppress an increase in contact resistance after power generation in a fuel cell environment even without using an Au, Ag, Pt, Pd, Ru, Rh, Ir, or Os precious metal, an alloy containing a precious metal, or $Cr_2N$, $CrSi_2$, VB, $V_8C_7$, VN, TaN, TaC, WC, WNb, or other electroconductive compound containing metal elements other than Ti, and a method of production of the same.

Solution to Problem

The gist of the present invention for solving the above problem is as follows:
(1) A titanium material for a solid polymer fuel cell separator having a low contact resistance which has at its surface a surface layer structure in which a Ti compound containing either C or N is dispersed, the Ti compound being covered by titanium oxide and/or metal Ti, the titanium material characterized in that, when analyzed from the titanium material surface by XPS (X-ray photoelectron spectroscopy), a Ti2p spectrum of $TiO_2$ is detected, further, at a Ti2p spectral energy range (454.2 eV to 455.1 eV) of TiO and/or a Ti2p spectral energy range (453.7 eV to 453.9 eV) of metal Ti, a Ti2p spectrum of TiO and/or a Ti2p spectrum of metal having a Ti maximum detection peak height (c/s) of at least 3 times the standard deviations of the backgrounds (c/s) at the respective spectral energy ranges is detected, and at a C1s spectral energy range (280 to 283 eV) and N1s spectral energy range (394 to 398 eV), a spectrum of C1s and a spectrum of N1s having a maximum detection peak height (c/s) of less than 3 times the standard deviations of the backgrounds (c/s) at the respective spectral energy ranges of C1s and N1s are detected, where the background (c/s) at each spectral energy range is measured by removing the surface layer part of the titanium material having that structure and exposing the titanium material at the base.
(2) A titanium material for a solid polymer fuel cell separator having a low contact resistance as set forth in (1), characterized in that the Ti compound containing either C or N contains, as a component phase, TiC or TiC and $TiN_{0.3}$.
(3) A titanium material for a solid polymer fuel cell separator having a low contact resistance as set forth in (1) or (2), characterized in that X-ray photoelectron spectroscopy is used to separate the peaks of the Ti2p photoelectron spectrum obtained from the surface of the titanium material and find the areas of the peaks of the $TiO_2$, $Ti_2O_3$, TiO, and metal Ti and in that the ratios of the sum of the areas of the peaks of TiO and metal Ti to the total sum of these areas is 15 to 40%.
(4) A titanium material for a solid polymer fuel cell separator having a low contact resistance as set forth in any one of (1) to (3), characterized in that the color of the titanium material surface is, by the L*a*b* color scale, L*: 50 to 63, a*: −5 to −1, and b*: 2 to 6.
(5) A titanium material for a solid polymer fuel cell separator having a low contact resistance as set forth in any one of (1) to (4), characterized in that the titanium material is industrial use pure titanium of JIS Type 1.
(6) A method of production of a titanium material for a solid polymer fuel cell separator having a low contact resistance as set forth in any one of (1) to (5), characterized by immersing a titanium material, having a C concentration of 10 to 40 mass % at a position of a depth of 10 nm from the surface and having a Ti compound containing C, in a nitric acid aqueous solution having a concentration of 15 to 59 mass % and a temperature of 40 to 120° C. for 5 seconds to 120 minutes or by coating the titanium material with the nitric acid aqueous solution, then washing it.
(7) A method of production of a titanium material for a solid polymer fuel cell separator having a low contact resistance as set forth in any one of (1) to (5), characterized by immersing a titanium material, having a C concentration of 10 to 40 mass % and an N concentration of 5 to 35 mass % at a position of a depth of 10 nm from the surface and having a Ti compound containing either C or N, in a nitric acid aqueous solution having a concentration of 15 to 59 mass % and a temperature of 40 to 120° C. for 5 seconds to 120 minutes or by coating the titanium material with the nitric acid aqueous solution, then washing it.

(8) A method of production of a titanium material for a solid polymer fuel cell separator having a low contact resistance as set forth in (6) or (7), characterized in that the titanium material is a titanium material having a C concentration higher than an O concentration to a depth of 10 nm from the surface.
(9) A method of production of a titanium material for a solid polymer fuel cell separator having a low contact resistance as set forth in any one of (1) to (5), characterized by cold rolling the titanium material using a lubricant containing C, then heat treating it in an inert gas atmosphere or vacuum atmosphere at 500 to 890° C. for 5 seconds to 10 minutes, then immersing it in a nitric acid aqueous solution having a concentration of 15 to 59 mass % and a temperature of 40 to 120° C. for 5 seconds to 120 minutes or coating the titanium material with the nitric acid aqueous solution, then washing it.
(10) A method of production of a titanium material for a solid polymer fuel cell separator having a low contact resistance as set forth in any one of (6) to (9), characterized in that the immersion is immersion in a 50 to 300 g/l sulfuric acid aqueous solution containing 10 to 100 g/l of $Cr^{6+}$ ions at a temperature of 50° C. to the boiling point for 30 seconds to 60 minutes and in that the coating is coating of the sulfuric acid aqueous solution.

Here, the phrase described in claim 1 and the above (1) that "at a Ti2p spectral energy range (454.2 eV to 455.1 eV) of TiO and/or a Ti2p spectral energy range (453.7 eV to 453.9 eV) of metal Ti, a Ti2p spectrum of TiO and/or a Ti2p spectrum of metal having a Ti maximum detection peak height (c/s) of at least 3 times the standard deviations of the backgrounds (c/s) at the respective spectral energy ranges is detected" means that at the titanium material surface, in addition to $TiO_2$, the presence of TiO and/or metal Ti was confirmed by XPS. Further, "at a C1s spectral energy range (280 to 283 eV) and N1s spectral energy range (394 to 398 eV), a spectrum of C1s and a spectrum of N1s having a maximum detection peak height (c/s) of less than 3 times the standard deviations of the backgrounds (c/s) at the respective spectral energy ranges of C1s and N1s are detected" means that at the titanium material surface, no Ti compound containing either C or N can be detected by XPS. XPS shows the results reflecting the state at the surface down to a depth of about 5 nm from the titanium material surface (extreme surface layer). In the present invention, right under that surface, a Ti compound including either of C and N is present. By observation of the cross-section of the surface layer under a transmission electron microscope, a surface layer structure where the titanium material surface side has particles of a Ti compound including either of C and N (TiC or $TiN_{0.3}$ particles) covered by titanium oxide and/or metal Ti dispersed in it can be confirmed. Further, at the titanium material surface, a Ti compound containing either C or N cannot be detected by XPS, but by sputtering the titanium material surface and performing XPS in the depth direction, at a predetermined depth, photoelectron spectrums of C1s and N1s corresponding to the binding energy positions of C—Ti and N—Ti are detected and therefore the presence of a Ti compound including either of C and N can be judged. From this depth direction XPS as well, it can be confirmed that the particles of the Ti compound including either of C and N are covered by a certain extent of thickness of titanium oxide and/or metal Ti.

Note that, C and N deposited on the surface derived from contamination and C or N forming compounds with Ti differ in their spectral energy ranges, so can be discriminated. That is, if the photoelectron spectrums of C1s and N1s corresponding to binding energy positions of C—Ti and N—Ti are detected by XPS, it can be judged that C—Ti and N—Ti compounds are present.

Further, the presence of a Ti compound containing C and the presence of a Ti compound containing either C or N described in claim 6 and claim 7 can be judged by detection of the photoelectron spectrums of C1s and N1s in spectral energy ranges where the surface deposition of C and N derived from contamination can be identified from the spectrum obtained by XPS, that is, the detection of peaks at binding energy positions of C—Ti and N—Ti.

Advantageous Effects of Invention

According to the present invention, even without using Au, Ag, Pt, Pd, Ru, Rh, Ir, and Os precious metals, alloys containing precious metals, or electroconductive compounds containing metal elements other than Ti ($Cr_2N$, $CrSi_2$, VB, $V_8C_7$, VN, TaN, TaC, WC, WNb, etc.), it is possible to provide a titanium material for a solid polymer fuel cell separator having a low contact resistance wherein the initial contact resistance is low and an increase in the contact resistance after power generation in a fuel cell environment can be suppressed and a method of production of the same. Accordingly, it is possible to provide a solid polymer fuel cell which is kept down production costs, high in performance, and long in life.

DESCRIPTION OF EMBODIMENTS

Figure 1:
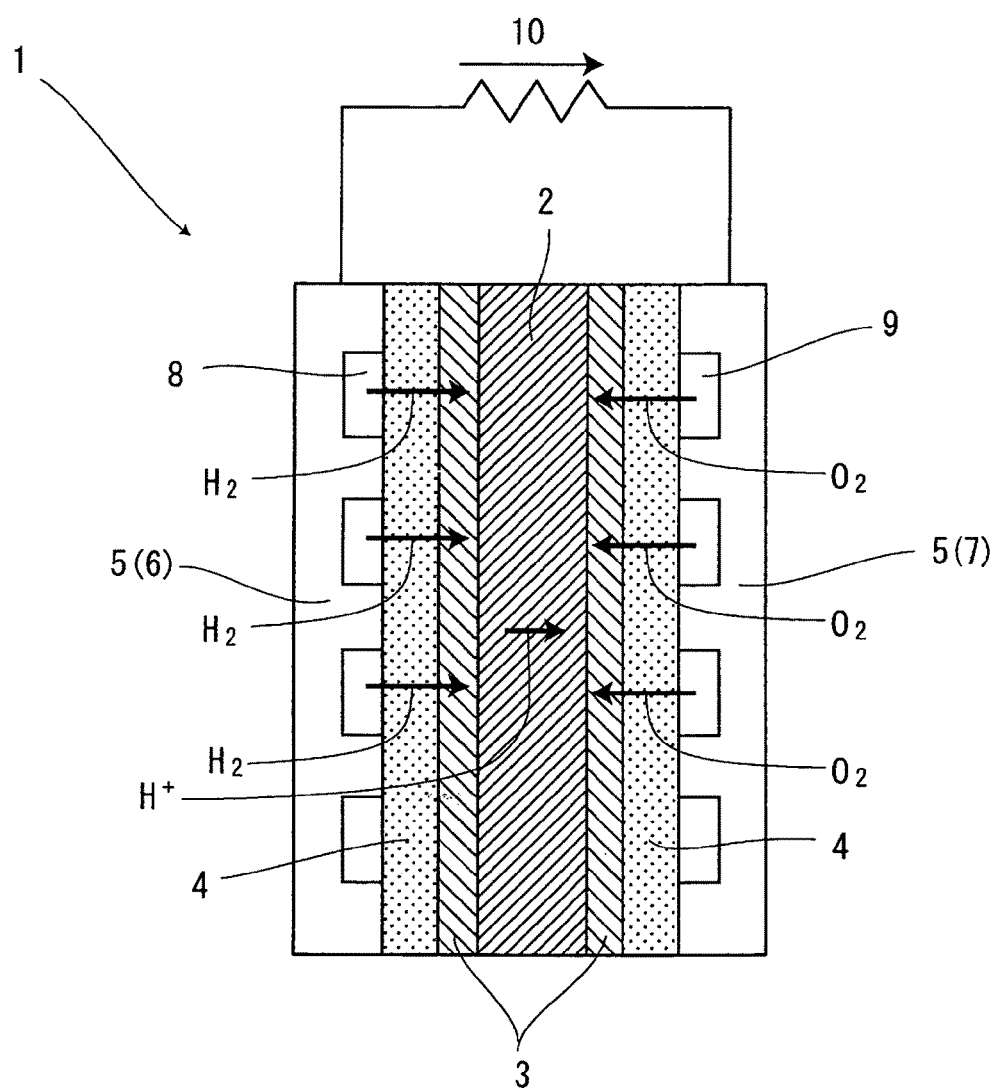
FIG. 1 is a view for explaining the configuration of a solid polymer fuel cell.

The present invention will be explained in detail below.
As explained before, the separator 5, a component element of the solid polymer fuel cell 1 shown in FIG. 1, is required to have, as basic properties, electroconductivity, in particular a small contact resistance between the surface of the separator 5 and the carbon paper 4 when receiving current from the carbon paper 4.

Further, the solid polymer fuel cell 1 has a solid polymer membrane 2 of an electrolyte having a strong acidity and generates water due to a reaction proceeding at a temperature of about 150° C. or less, so the material of the separator 5 is required to have a corrosion resistance and durability sufficient to withstand the corrosive environment at that temperature and acidic aqueous solution.

The inventors, based on the above points, discovered, in a titanium material having sufficient corrosion resistance in the above environment, a surface layer structure (that is, the surface and the internal structure directly below it) of the'titanium material having a good electroconductivity and able to achieve both a low ion elution in a fuel cell environment and suppression of precipitation of titanium oxides and a method of production of the same and thereby completed the present invention.

The surface layer structure of the present invention has a Ti compound containing either C or N covered by titanium oxide (mainly $TiO_2$, TiO) and/or metal Ti dispersed in it. Due to this, the titanium oxide (mainly $TiO_2$, TiO) and metal Ti at the surface will maintain the low ion elution property (high corrosion resistance), while the Ti compound containing either C or N underneath it or the TiO and/or metal Ti at the surface can be used to secure a good electroconductivity of the surface layer. Here, it is believed that the TiO and/or metal Ti also contribute to securing the electroconductivity of the surface layer. In addition, in the present invention, at the titanium material surface, the C—Ti compounds (TiC, TiCN, etc.) and, further, the N—Ti compounds (TiN, $Ti_2N$, etc.) were made levels not detectable by XPS. This is because a Ti compound containing C or N (TiC, TiCN, $Ti_2N$, TiN, etc.) has a high electroconductivity, but easily is eluted in a fuel cell environment and invites an increase in the contact resistance during power generation. This trend is particularly remarkable in a C—Ti compound, so the idea is to make the final surface of the titanium material to be used for the separator a structure where these compounds are kept from being exposed as much as possible. In the surface layer structure of the present invention, the Ti compound containing either C or N which easily elutes in a fuel cell environment is covered by titanium oxide (mainly $TiO_2$, TiO) and/or metal Ti so as to achieve both corrosion resistance and electroconductivity.

Below, the grounds for setting the different elements of the present invention will be explained. In the present invention, various requirements were determined based on an initial contact resistance of less than 10 $m\Omega \cdot cm^2$ and a contact resistance after 5000 hours power generation of less than 20 $m\Omega \cdot cm^2$.

First, the inventors measured the contact resistance when reducing, and further removing, all Ti compounds containing either C and N, which easily elute in a fuel cell environment, from the titanium material surface and thereby obtained a grasp of the contact resistance based on an ordinary titanium surface. They used cold rolled 0.15 mm sheets of industrial use pure titanium of JIS Type 1 to prepare three types of sheets, that is, a sheet held in a vacuum at 600 to 790° C. for 5 hours for long vacuum atmosphere annealing (below, "long vacuum annealed sheet"), further, the annealed sheet pickled by a nitric/fluoric acid aqueous solution (mixed aqueous solution of nitric acid and fluoric acid) to dissolve away the surface to remove the compounds (below, "nitric/fluoric acid pickled sheet"), and, in addition, a titanium sheet polished at the surface (below, "polished sheet"). Note that, due to the long vacuum annealing, the C from the residual oil of the cold rolling evaporates to the outside and sufficiently diffuses to the inside of the titanium, so the amount of C (TiC) directly below the surface of the titanium material is reduced. At the surface layer of the above prepared sheets, it was confirmed that the C concentration was less than 7 mass %. As a result, the contact resistances of the long vacuum annealed sheet, nitric/fluoric acid pickled sheet, and polished sheet were all extremely high values of 60 to 200 $m\Omega \cdot cm^2$ at the initial stage. This is believed to be because, usually, the oxide layer (oxide film) at the titanium material surface forms a layer structure from the outermost surface toward the inside of $TiO_2$, $Ti_2O_3$, TiO, and Ti and the layer comprised of only the $TiO_2$ covering the outermost surface causes the contact resistance to become high.

On the other hand, to form a Ti compound containing C or N (mainly TiC) on the surface, when annealing cold rolled 0.15 mm industrial use pure titanium JIS Type 1 titanium sheet in an Ar gas atmosphere at 750° C. for a short time of 30 seconds (below, "short Ar atmosphere annealed sheet"), the contact resistance was an extremely low 5 to 15 $m\Omega \cdot cm^2$ or about the same as the case of depositing a precious metal or electroconductive compound on the surface. However, the contact resistance after a 5000 hours power generation test increased to about 120 $m\Omega \cdot cm^2$.

In the above way, due to the cold rolling by which a usual titanium material is produced, the annealing in a vacuum or inert gas (Ar, He) atmosphere, and further the nitric/fluoric acid pickling or polishing, a stable low contact resistance can be obtained.

As opposed to this, the inventors discovered that by dissolving and leaving behind part of any Ti compound containing C or N while causing the formation of high corrosion resistance titanium oxide ($TiO_2$, TiO) or metal Ti so as to cover the surface, stable low contact resistance can be obtained.

Figure 2:
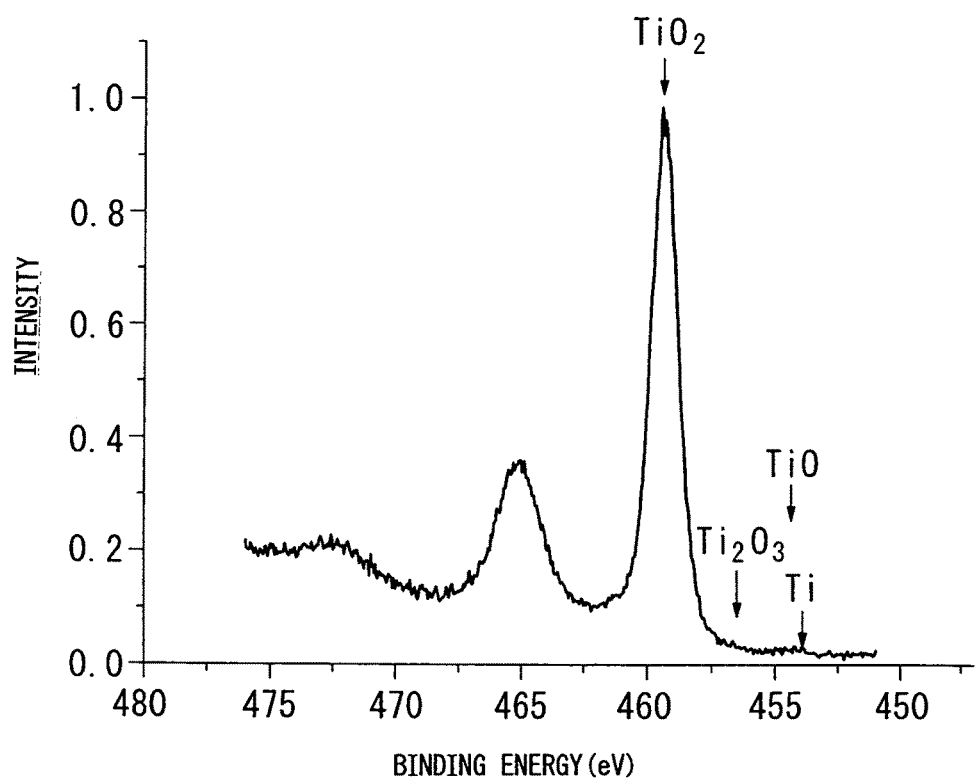
FIG. 2 is a view showing a photoelectron spectrum measured by XPS at a nitric/fluoric acid pickled sheet surface.

In high initial contact resistance long vacuum annealed sheet, nitric/fluoric acid pickled sheet, and polished sheet, an XPS spectrum such as shown in FIG. 2 is obtained. There is a sole peak of $TiO_2$. TiO and metal Ti are not detected.

Figure 3:
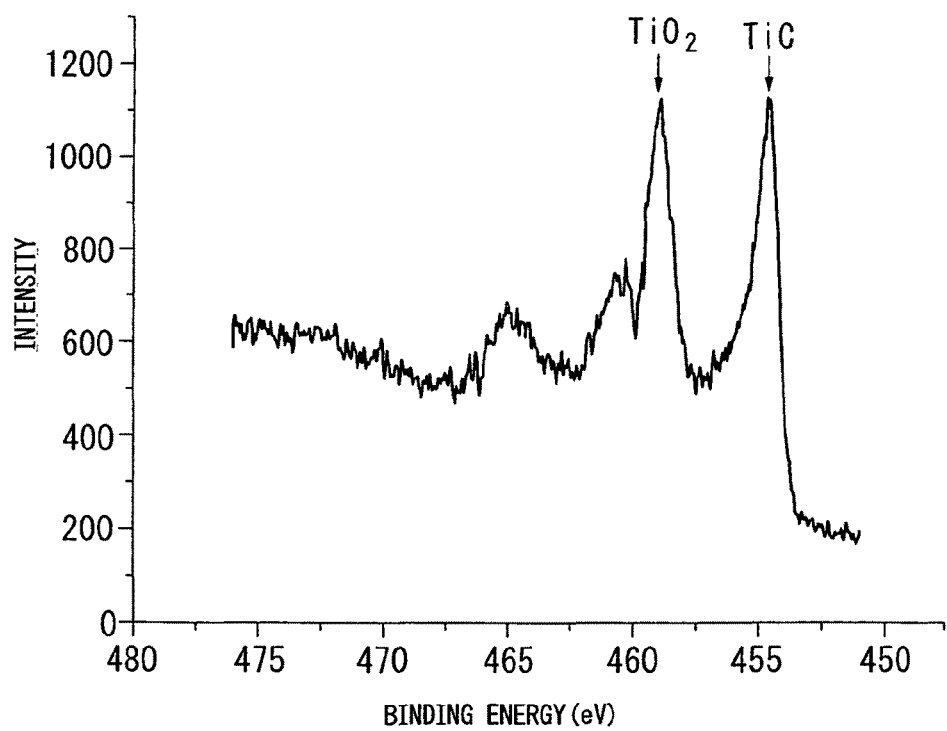
FIG. 3 is a view showing the photoelectron spectrum measured by XPS of the surface of a sheet annealed in an Ar atmosphere.

In the short Ar atmosphere annealed sheet (750° C., 30 sec) where the initial contact resistance was low, but the contact resistance ended up greatly increasing after power generation, as shown by the XPS spectrum shown in FIG. 3, a strong peak of TiC is detected. Further, except for contamination, strong peaks are detected at the C1s and N1s photoelectron spectrums, so it is believed that C—Ti and N—Ti compounds are also mixed in. That is, it shows that, in the initial state, at the surface, a Ti compound containing either C or N is distributed in large amounts. It is learned that this Ti compound containing either C or N lowers the initial contact resistance.

Figure 4:
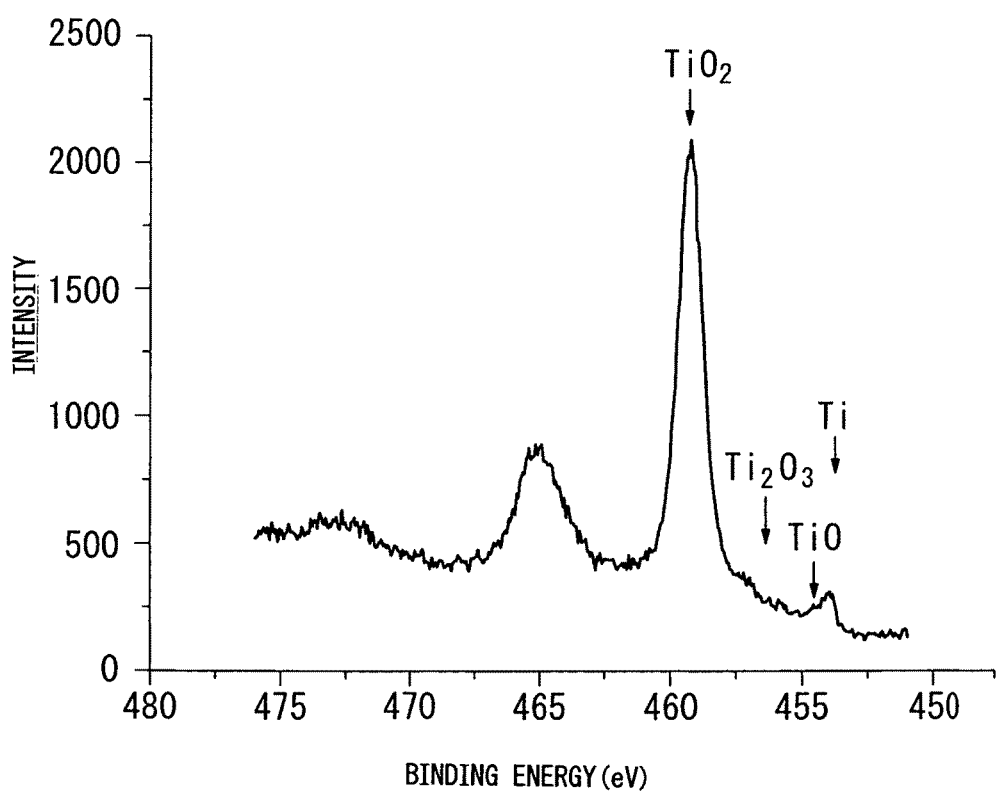
FIG. 4 is a view showing the photoelectron spectrum measured by XPS of the surface of a sheet annealed in an Ar atmosphere, then subjected to a predetermined nitric acid treatment in the present invention.

The surface of the titanium material of the present invention has, in addition to $TiO_2$, one or both of TiO and metal Ti distributed over it. TiC, TiCN, and other Ti compounds containing either C or N are not detected. As will be understood from the XPS spectrum of the present invention shown in FIG. 4, there is a strong peak at the binding energy position of $TiO_2$ and a clear peak is detected at the binding energy position of TiO or metal Ti. Further, except for contamination, it is believed that no peak is detected at the photoelectron spectrums of C1s and N1s, so a Ti compound of C—Ti (TiC) or N—Ti is not exposed at the surface.

Figure 5:
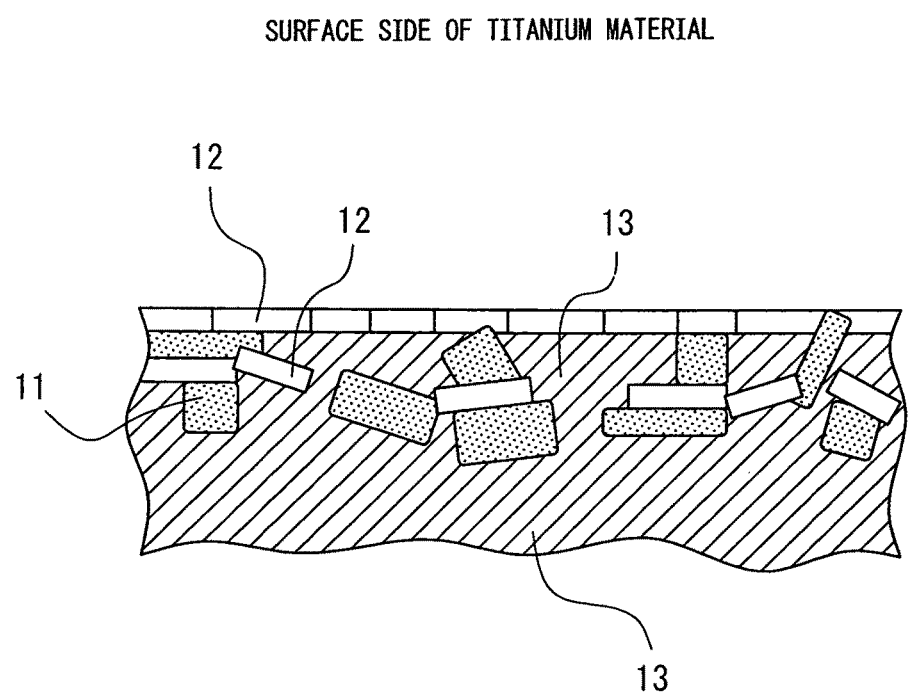
FIG. 5 is a schematic view showing an example of a surface layer structure of the present invention.

As a result of observation of the cross-section of the surface layer of the present invention under a transmission electron microscope (below, TEM), the surface layer structure, as shown in FIG. 5, had the Ti compound 11 including either of C and N covered by titanium oxide 12 and/or metal Ti 13. The Ti compound 11 including either of C and N had a size of about 10 to 300 nm. The surface layer forming the structure with these dispersed in it had a thickness of about 50 to 500 nm. In general, there were locations where the Ti compound 11 containing either C or N appeared to pass through the titanium material surface, but as explained above, in XPS, no peaks of the photoelectron spectrums of C and N are detected from the surface, so it is believed that this is protected by being covered by the extremely thin titanium oxide and metal Ti. This Ti compound 11 containing either C or N was identified by electron diffraction of TEM as being TiC or $TiN_{0.3}$. Note that, this titanium oxide 12 exhibited a halo pattern in electron diffraction of TEM, so was amorphous, but in thin film X-ray diffraction of the surface (X-ray incident angle 1°), no peak of a Ti compound containing either C or N was detected. Other than metal Ti, while weak, a diffraction peak of anatase type $TiO_2$ was detected. From this, it is believed that crystalline titanium oxide is included in part.

By sputtering the titanium material surface and performing XPS in the depth direction, at a predetermined depth ($SiO_2$ converted depth, about 10 to 30 nm from the surface), a photoelectron spectrum of C1s corresponding to the binding energy position of C—Ti which could not be detected at the surface is detected. In addition, sometimes a photoelectron spectrum of N1s corresponding to the binding energy position of N—Ti is detected. From these facts as well, it is understood that a Ti compound including either of C and N is present directly under the surface.

Therefore, in claim 1 of the present invention, the titanium material is made a titanium material having a surface layer structure at its surface where a Ti compound including either of C and N covered by titanium oxide or metal Ti is dispersed and is made one where one or both of TiO and metal Ti are detected, in addition to $TiO_2$, from the surface by XPS, but a Ti compound containing either C or N is not detected.

In claim 2, the titanium material is made the titanium material of claim 1 in which the Ti compound containing either C or N dispersed at the surface layer contains, as a component phase, TiC or TiC and $TiN_{0.3}$. Note that, while explained later, the information of XPS, from the measurement conditions used, shows the state of the oxide layer from the surface to a depth of about 5 nm. If sputtering the surface and performing XPS in the depth direction, $TiO_2$ is confirmed down to a 3 to 25 nm depth. When the depth at which $TiO_2$ is confirmed is 3 to 15 nm, further 3 to 10 nm, the contact resistance after 5000 hours power generation becomes a lower value. Note that, the above-mentioned depth is the depth when sputtering $SiO_2$ ions under the same conditions, the so-called $SiO_2$ converted depth. However, titanium oxide is reduced by ion sputtering or other ion irradiation, so the depth of $TiO_2$ before sputtering may be larger than the above measurement value.

Further, at the surface of the titanium material of the present invention, the peaks of the Ti2p photoelectron spectrum of XPS were separated and the areas of the peaks of $TiO_2$, $Ti_2O_3$, TiO, and metal Ti were found. The ratio of the areas of the peaks of TiO and metal Ti combined to the total sum of the areas is 15 to 40% in range. In this way, at the surface to extreme surface layer part, the distribution of a certain extent of TiO and/or metal Ti is believed to contribute to low contact resistance, so in claim 3, the ratio of the sum of the peaks of TiO and metal Ti was made 15 to 40%. Here, the "area of a peak" indicates the area of the part surrounded by the rising edge of the peak to the end point and the background.

The above binding state of Ti and O, C or N and Ti compounds, depth of $TiO_2$ layer, and other results of analysis of the titanium material surface layer structure are results of analysis by XPS and results of observation of the cross-section of the surface layer by TEM. As the conditions for XPS analysis, the analysis may be performed by the following method.

Al—Kα rays made monochromic by a monochromator were fired at the titanium material, then the photoelectrons of C1s, N1s, O1s, and Ti2p emitted from the titanium material surface were measured by a hemispherical electron spectrometer. The size of the analysis point was made 100 μm, while the takeout angle of the photoelectrons was set to 45°. To make up for the charge due to the emission of photoelectrons, an electron shower was fired to prevent chargeup of the sample surface. The is peak from contamination C of the sample surface was matched with 284.6 eV to correct the energy of the photoelectron spectrum. Titanium oxide is reduced by firing of ions, so the analysis was conducted without ion sputtering for removing contamination. Further, regarding the Ti2p spectrum, it is assumed that there is a peak of $TiO_2$ at the corresponding position of 459.2 eV, $Ti_2O_3$ 456.5 eV, TiO 454.2 eV, and Ti (metal Ti) 453.9 eV. A Gauss function was used for fitting to separate the waveform and find the areas of the peaks. The ratio of the sum of the areas of the peaks of TiO and Ti (metal Ti) to the total sum of the areas of the peaks of $TiO_2$, $Ti_2O_3$, TiO, and Ti was found. Note that, TiC is 454.6 eV.

A sample for TEM observation was prepared by the following method. That is, the FIB (focused ion beam) method using a Ga ion beam was used to work a thin film sample of a cross-section including the surface to a thickness of 0.1 μm for use as a sample for TEM observation. The TEM observation was performed using a 200 kV field emission transmission electron microscope. EDS (energy dispersive X-ray spectroscopy) was used for qualitative analysis and electron diffraction analysis was performed to identify the compounds in the observed field.

Further, the inventors discovered that the color of the titanium material surface causes a difference in behavior of the contact resistance and that when the color is, by the L*a*b* color scale defined by the JIS Z8729, L*: 50 to 63, a*: −5 to −1, and b*: 2 to 6, both the initial contact resistance and the contact resistance after 5000 hours power generation are low and are respectively less than 10 mΩ·cm$^2$ and not more than 20 mΩ·cm$^2$. The physical mechanism is not clear, but the oxide film is thin in thickness, so is not an interference color, but it is believed the material color contributes to the color. It is guessed that there is a characterizing feature in the material band structure etc. of the surface of the titanium material affecting the electroconductivity.

Therefore, in claim 4, the color of the titanium material surface was made, by the L*a*b* color scale, L*: 50 to 63, a*: −5 to −1, and b*: 2 to 6. Preferably, the contact resistance after 5000 hours power generation stabilizes at the lower 15 mΩ·cm$^2$ or less, so L* is made 53 to 61.5. Details will be given later, but due to the nitric acid treatment of the present invention, there is the unique phenomenon of the indicator of the lightness of the color of the titanium material, that is, L*, falling. L* falls from about 65 to 70 down to 50 to 63 due to the nitric acid treatment of the present invention. Note that there was no great change in a* and b*.

The present invention excludes titanium alloys to which precious metals are added. While not limited in composition of ingredients, from the viewpoint of the material prices, recyclability, and workability, it is preferable to use soft industrial use pure titanium of JIS Type 1 (JIS H46000). Therefore, in claim 5, there is provided any of claims 1 to 4 wherein the titanium material is industrial use pure titanium of JIS Type 1.

Next, the method of production of the present invention material will be explained The inventors discovered that, to form the surface layer structure of the present invention, by first creating a surface state at the surface layer of the titanium material where a Ti compound containing C is present in at least a predetermined amount, then performing a predetermined nitric acid treatment, the Ti compound containing C is dissolved or modified—which is extremely effective for forming the oxide layer structure of claims 1 to 5 of the present invention. Note that, a "Ti compound containing C" includes TiC, TiCN, etc.

To obtain the titanium material for a separator having a low contact resistance as set forth in claims 1 to 5, it is necessary to immerse a titanium material having a surface layer rich in C, having a concentration at a position of a depth of 10 nm from the surface of 10 to 40 mass %, and having a Ti compound containing C, as nitric acid treatment, in a nitric acid aqueous solution having a concentration of 15 to 59 mass % and a temperature of 40 to 120° C. for 5 seconds to 120 minutes or coating the titanium material by the nitric acid aqueous solution, then washing it. These production conditions are made claim 6.

Here, the C concentration of the titanium of the base is, by JIS and other standards, 0.1 mass % or more. When the C concentration is clearly higher than this (for example, 1 mass %), it can be said that the C is rich.

When there is almost no C rich layer present or when the C concentration at 10 nm depth is lower than 10 mass %, TiC and other Ti compounds containing C are not sufficiently formed, so even if applying a nitric acid treatment, the surface layer structure of the present invention (a surface layer structure at which a Ti compound containing either C or N covered by titanium oxide (mainly $TiO_2$, TiO) and/or metal Ti is dispersed) is not sufficiently formed and the effect of the present invention cannot be sufficiently obtained. On the other hand, when the C concentration at 10 nm depth is higher than 40 mass %, TiC and other C—Ti compounds are greatly formed, so even if applying a nitric acid treatment, TiC and other Ti compounds containing C will greatly remain at the surface in some cases and the surface layer structure of the present invention cannot be obtained, so the contact resistance after 5000 hours power generation ends up increasing. Therefore, preferably, the titanium material is made one having a C concentration at a position of a depth of 10 nm from the surface of 15 to 35 mass % and having a Ti compound containing C present. In addition, a titanium material having a thickness of a C rich layer, of a C concentration of 10 mass % or more, of 20 nm to 200 nm is easy to produce from the viewpoint of the heat treatment etc., so the titanium material is preferably one having a thickness of a C rich layer, of a C concentration of 10 mass % or more, of 20 nm to 200 nm.

Regarding N as well, while not to the extent of C, there are similar actions, so claim 7 adds to claim 6 that the titanium material be one having an N concentration at 10 nm depth of 5 to 35 mass % and having a Ti compound containing either of C or N. In the same way as a Ti compound containing C, $TiN_{0.3}$, $Ti_2N$, TiN, or another Ti compound containing N also may be dissolved or modified by nitric acid treatment so as to contribute to the formation of the surface layer structure of claims 1 to 5 of the present invention. If the N concentration is less than 5 mass %, even if performing the nitric acid treatment, the surface layer structure of the oxide layer of the present invention oxide layer cannot be obtained and sometimes a sufficient effect cannot be obtained. Preferably, the N concentration at a position of a depth of 10 nm is 7 to 25 mass %.

In the method of production of claim 6 and claim 7, by using a titanium material with a higher C concentration than O concentration down to a depth of 10 nm from the surface, a lower contact resistance can be obtained, so claim 8 further adds this point.

In each of claims 6 to 8, to obtain the effect of the nitric acid treatment, it is necessary to at least make the nitric acid concentration 15 mass % or more. However, if the nitric acid concentration exceeds 59%, the solubility of the metal titanium will increase, so 59% is made the upper limit. To cause the reaction, a certain extent of heat energy is required. At least 40° C. or more is necessary. The higher the treatment temperature, the shorter the time for a sufficient effect to be obtained, but treatment over 120° C. requires performance using a pressure vessel etc. and, further, the effect of shortening the treatment time becomes substantially saturated as well, so the upper limit of the treatment temperature is made 120° C. Regarding the treatment time, to obtain at least the desired effect, 5 seconds or more of treatment time is required. Note that, regarding the treatment time, by making the time longer, there is no deterioration of the properties. However, even if treating the surface for over 120 minutes, the margin of improvement of the properties is substantially saturated, so 120 minutes is made the upper limit. Preferably, from the viewpoint of the treatment efficiency and work efficiency, the treatment is performed at a nitric acid concentration of 20 to 50 mass %, a temperature of 50 to 110° C., and a time of 1 minute to 100 minutes. This nitric acid treatment can give effects substantially the same as with both immersion and coating. Further, after the nitric acid treatment, the titanium surface is sufficiently washed so that no nitric acid aqueous solution remains.

As examples where the C concentration and N concentration at 10 nm depth and the presence of any Ti compound containing C or N are outside the ranges of claim 6, claim 7, and claim 8, nitric/fluoric acid pickled materials, long term annealed materials (vacuum or inert gas atmosphere), and polished materials may be mentioned. When subjecting these to similar nitric acid treatment, no bubbling occurs, and the initial contact resistance is a high 60 to 200 mΩ·$cm^2$ similar to before the nitric acid treatment. After 5000 hours power generation, the contact resistance increases by 10 to 50%. Note that, after the power generation, the titanium material separator exhibited clear coloring.

In the above way, if the surface state of the titanium material differs from that prescribed in the method of production of the present invention, even if simply performing similar nitric acid treatment, the oxide layer structure of the present invention cannot be obtained and, as a result, a low contact resistance cannot be obtained.

Further, as a feature of the nitric acid treatment of the present invention, bubbling is observed from the surface of the titanium material. As explained above, in a nitric/fluoric acid pickled material, a titanium material with low C and N concentrations of the surface layer due to long annealing, a polished material, or other case where there is no TiC, TiCN, TiN, $Ti_2N$, $TiN_{0.3}$, $TiC_{0.7}N_{0.3}$, etc. on the surface or the amount is small, no bubbling will occur even if performing similar nitric acid treatment. The presence/absence of this bubbling strongly suggests that the reaction which occurs at the time of nitric acid treatment and the structure of the surface and surface layer obtained as a result differ between the method of production of the present invention and otherwise.

Figure 6A:
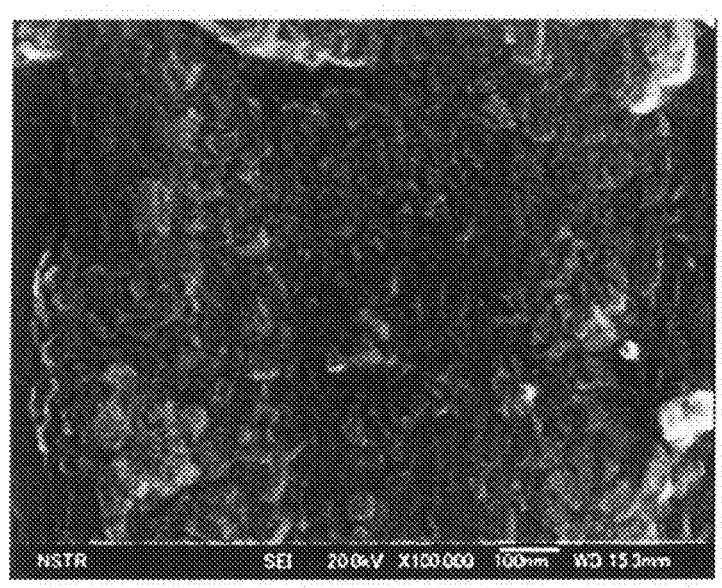
FIG. 6A is an SEM photograph showing the surface heat treated in Ar gas after cold rolling and before applying the nitric acid treatment of the present invention.
Figure 6B:
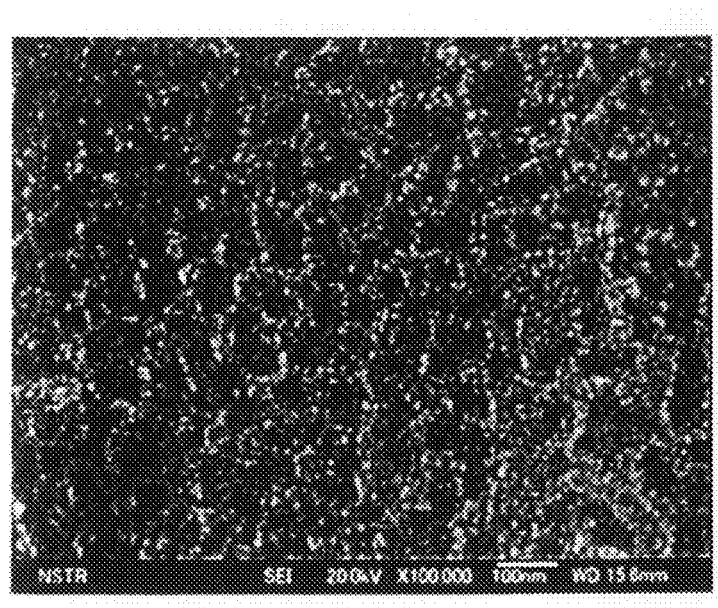
FIG. 6B is an SEM photograph showing the surface heat treated in Ar gas after cold rolling and after applying the nitric acid treatment of the present invention.

FIG. 6A shows an SEM photograph of the surface before the nitric acid treatment of the present invention, while FIG. 6B shows an SEM photograph of the surface after the nitric acid treatment of the present invention. The surface conditions clearly change before and after the nitric acid treatment. This strongly suggests that the nitric acid treatment causes the Ti compound containing either C or N to dissolve or be modified. Further, regarding the C concentration and O concentration of the surface, if comparing the change before and after the nitric acid treatment by EPMA or AES, the nitric acid treatment causes the C concentration to fall and the O concentration to increase. This corresponds to the change of the surface layer structure due to the present invention explained above. On the other hand, in the nitric/fluoric acid pickled material compared with, the same nitric acid treatment is performed, but no change occurred in the surface conditions, C concentration, and O concentration like in the present invention.

Here, the method of analysis of the titanium material surface before the above nitric acid treatment will be explained. The thickness of the C rich layer, the C concentration, and the N concentration were found by using glow discharge spectroscopy (below, GDS) to measure the profiles of concentrations of various elements in the depth direction at a 4 mm diameter region of the surface. Further, whether C or N and Ti compounds are formed is judged from the spectrums obtained by XPS by the detection of the photoelectron spectrum C1s or N1s excluding contamination and by the detection of peaks at the binding energy positions of C—Ti and N—Ti.

Next, the method of production of the present invention will be explained in further detail.

To obtain a titanium material before nitric acid treatment of claim 6, claim 7, and claim 8, it is necessary to apply short heat treatment in a state where is present at the surface. The conditions are the method of cold rolling the titanium material using a lubricant containing C, then heat treating it in an inert gas atmosphere comprised of Ar or He or in a vacuum atmosphere at 500 to 890° C. for 5 seconds to 10 minutes, then immersing it in a nitric acid aqueous solution having a concentration of 15 to 59 mass % and a temperature of 40 to 120° C. for 5 seconds to 120 minutes or coating the titanium material by the nitric acid aqueous solution, then washing it. This range of manufacturing conditions is made claim 9.

Due to this nitric acid treatment, the original color changed to become blackish. L* changed to from 50 to 63, a* from −5 to −1, and b* from 2 to 6. In particular, the indicator of lightness, L*, was about 65 to 70 before the nitric acid treatment, but fell due to the nitric acid treatment. As opposed to this, a general nitric/fluoric acid pickled material, long annealed material (vacuum or inert gas atmosphere), and polished material increased in L* due to this nitric acid treatment. This change of L*, in the same way as the abovementioned bubbling phenomenon, strongly suggests that the reaction which occurs at the time of nitric acid treatment and the structure of the oxide layer obtained as a result differ between the method of production of the present invention and otherwise.

To anneal and soften warping due to cold rolling and make the crystal grains a suitable size, heat treatment at 700 to 850° C. for 10 seconds to 5 minutes is preferable as a range. Note that, to cause C to sufficiently deposit on the surface, the cold rolling rate is preferably 20% or more. The effect of the present invention does not change before and after this heat treatment, even if molding to a predetermined shape for a separator, after performing the predetermined nitric acid treatment.

Note that, in the method of production of the present invention, after the cold rolling, no pickling is performed using nitric/fluoric acid or another fluoric acid, so both after the heat treatment and after the nitric acid treatment, F was not detected from the surface layer as a result of XPS or other analysis.

Even by treatment using chromic acid, a similar effect to the nitric acid treatment of claims 6 to 9 is obtained. The suitable range of conditions is a method of immersing a predetermined titanium material the same as in claims 6 to 9 in a 50 to 300 g/l sulfuric acid aqueous solution containing 10 to 100 g/l of $Cr^{6+}$ ions at a temperature of 50° C. to the boiling point for 30 seconds to 60 minutes or coating the titanium material with the sulfuric acid aqueous solution, then washing it. The range of conditions of this chromic acid treatment is made claim 10. If the concentration of $Cr^{6+}$ ions exceeds 100 g/l, after the chrome treatment, Cr sometimes precipitates on the titanium material surface and ends up becoming a source of ion elution during power generation. Preferably, from the viewpoint of the treatment efficiency and the cost of the solution, the treatment is chromic acid treatment of immersion in a 70 to 150 g/l sulfuric acid aqueous solution containing 20 to 50 g/l of $Cr^{6+}$ ions at a temperature of 80 to 120° C. for 5 to 30 minutes or coating the titanium material by the sulfuric acid aqueous solution.

As a prior example, when cold rolling pure titanium sheet, then applying a predetermined heat treatment in Ar gas, then performing anodic electrolysis (electrolytic pickling) in a nitric acid aqueous solution, only $TiO_2$ is detected at the Ti2p spectrum of XPS. L* showing the color is a high value of 65 to 68 even after the electrolytic pickling. It is known that the oxide layer formed by the anodic electrolysis (electrolytic pickling) is $TiO_2$ and that its structure is porous (sparse structure). Due to this $TiO_2$ layer, the initial contact resistance ends up being made to increase. Even if the initial contact resistance can be kept relatively low, in a power generation test, the $TiO_2$ layer at the surface is porous, so it is not possible to suppress the elution of the Ti compound containing either C or N directly under it and the contact resistance after power generation for 5000 hours exceeds 100 m$\Omega$·cm$^2$.

As opposed to this, the titanium material of the present invention differs in the point that in the spectrum obtained by XPS analysis of the surface, $TiO_2$ and TiO and/or metal Ti are detected and the L* showing the surface color is a low value of 50 to 63. In addition to the $TiO_2$ present at the surface, the TiO and metal Ti express the initial low contact resistance (less than 10 m$\Omega$·cm$^2$) and suppress the elution of a Ti compound containing either C or N dispersed directly below the surface, so enable less than 20 m$\Omega$·cm$^2$ to be maintained even after a 5000 hours power generation test.

Anodic electrolysis (electrolytic pickling) results in a porous layer since a $TiO_2$ layer having a stable thickness is compulsorily forced by that potential, while the immersion or coating of the present invention is a relatively static reaction where dense, high stability titanium oxide ($TiO_2$ and TiO) is believed to be formed. Further, by giving potential to a nitric acid aqueous solution or other solution, the stable compound phase changes, so depending on the potential, the Ti compound containing either C or N which is dissolved or modified also differs. In this way, in the method of the present invention of immersion in a nitric acid aqueous solution etc. or coating of a nitric acid aqueous solution etc. and the conventional method of electrolytic pickling by a nitric acid aqueous solution etc., the surface layer structure which is formed differs and the effect of suppression of the increase of contact resistance after power generation also differs. Therefore, in claims 6 to 10 of the present invention, the treatment was made not electrolytic pickling, but immersion or coating.

EXAMPLE 1

Claims 1, 3, 4, and 5 of the present invention will be explained in further detail using the following examples.

Table 1-1 to Table 4 show examples using cold rolled sheets of thickness 0.1 to 0.2 mm industrial use pure titanium JIS Type 1.

Table 1-1 and Table 1-2 show the effects of the manufacturing conditions before nitric acid treatment and the structures of the surface oxide layers after nitric acid treatment, Table 3 shows the effects of the nitric acid treatment conditions, and Table 4 shows the effects of the chromic acid treatment conditions. Table 1-1, Table 1-2, Table 3, and Table 4 show the initial contact resistance and the contact resistance after 5000 hours power generation and, as characteristics of the titanium material surface, the depth of the $TiO_2$ layer, C—Ti compounds, N—Ti compounds, presence of TiO or metal Ti, ratio of peak areas combining TiO₂ and metal Ti, and color (L*, a*, b*). Furthermore, they show the results when sputtering the surface in the XPS system and analyzing the presence of any peaks of the photoelectron spectrums of C1s and N1s corresponding to C—Ti compounds and N—Ti compounds directly under the surface, that is, from the surface down to a 10 to 30 nm depth (SiO₂ converted depth).

Further, Table 2 shows, regarding the characterizing features of the titanium material surface before nitric acid treatment, the thickness of the C rich layer (C concentration of 10 mass % or more), the C concentration and N concentration at 10 nm depth, the relative sizes of the C concentration and O concentration, and the presence of any C—Ti compounds and N—Ti compounds.

Note that, the XPS analysis of the titanium material surface was performed under the following conditions.

Al—Kα rays made monochromic by a monochromator were fired at the titanium material, then the photoelectrons of C1s, N1s, O1s, and Ti2p emitted from the titanium material surface were measured by a hemispherical electron spectrometer. The size of the analysis point was made 100 μm, while the takeout angle of the photoelectrons was set to 45°. To make up for the charge due to the emission of photoelectrons, the means was adopted of firing an electron shower to prevent chargeup of the sample surface. The 1s peak from contamination (C) of the sample surface was matched with 284.6 eV to correct the energy of the photoelectron spectrum. Titanium oxide is reduced by firing of ions, so the analysis was conducted without ion sputtering for removing contamination. Further, regarding the Ti2p spectrum, it is assumed that there is a peak of TiO₂ at the corresponding position of 459.2 eV, Ti₂O₃ 456.5 eV, TiO 454.2 eV, and Ti (metal Ti) 453.9 eV. A Gauss function was used for fitting to separate the waveform and find the areas of the peaks. The ratio of the sum of the areas of the peaks of TiO and Ti (metal Ti) to the total sum of the areas of the peaks of TiO₂, Ti₂O₃, TiO, and Ti was found. Note that, TiC is 454.6 eV.

By this method, the titanium material surface layer was analyzed by XPS. At the Ti2p spectral energy range of TiO (454.2 eV to 455.1 eV) and the Ti2p spectral energy range of metal Ti (453.7 eV to 453.9 eV), when the maximum detection peak heights (c/s) are 3 times or more the standard deviations of the backgrounds (c/s) at those spectral energy ranges, it was judged that there were TiO and metal Ti respectively, while conversely when they were less than 3 times the standard errors of the backgrounds (c/s), it was judged that there were no TiO and metal Ti. Further, at the C1s spectral energy range (280 to 283 eV) and N1s spectral energy range (394 to 398 eV), when the maximum detection peak heights (c/s) are 3 times or more the standard errors of the backgrounds (c/s) at the spectral energy ranges of C1s and N1s, it was judged that there were C—Ti compounds and N—Ti compounds, while conversely when they were less than 3 times the standard errors of the backgrounds (c/s), it was judged that there were no C—Ti compounds and N—Ti compounds.

Next, in the XPS system, the surface of the titanium material was sputtered, suitable XPS analysis was performed directly under the surface, that is, from the surface to a 10 to 30 nm depth (SiO₂ converted depth), and the same standard as with the above titanium material surface was used to judge for the presence of any C—Ti compounds and N—Ti compounds directly under the surface.

Here, the standard background (c/s) levels at the different spectral energy ranges were measured after ending the above XPS analysis, then further sufficiently removing the surface layer part of the titanium material by Ar sputtering to expose the titanium material (metal titanium), and performing XPS analysis in that state.

TABLE 1-1

| No. | Manufacturing conditions before nitric acid treatment | Nitric acid treatment #2 | Contact resistance (mΩ·cm²) Initial | After 5000 hours power generation |
|---|---|---|---|---|
| Comp. ex. 1 | Nitric/fluoric acid pickling finished material #1 | No | 63 | 85 |
| Comp. ex. 2 | Polished material | No | 202 | 232 |
| Comp. ex. 3 | Cold rolling, then holding in vacuo at 700° C., 5 hr | No | 147 | 220 |
| Comp. ex. 4 | Pickling by nitric/fluoric acid, then holding in Ar gas at 750° C., 30 sec | No | 118 | 134 |
| Comp. ex. 5 | Nitric/fluoric acid pickling finished material #1 | Yes | 69 | 76 |
| Comp. ex. 6 | Polished material | Yes | 208 | 286 |
| Comp. ex. 7 | Cold rolling, then holding in vacuo at 600° C., 5 hr | Yes | 103 | 128 |
| Comp. ex. 8 | Cold rolling, then holding in vacuo at 700° C., 5 hr | Yes | 148 | 226 |
| Comp. ex. 9 | Cold rolling, then holding in vacuo at 790° C., 5 hr | Yes | 208 | 255 |
| Comp. ex. 10 | Pickling by nitric/fluoric acid, then holding in Ar gas at 750° C., 30 sec | Yes | 89 | 103 |
| Comp. ex. 11 | Pickling by nitric/fluoric acid, then holding in 700° C., 5 hr | Yes | 109 | 124 |
| Comp. ex. 12 | Cold rolling, then holding in Ar gas at 500° C., 3 sec | No | 9 | 222 |
| Comp. ex. 13 | Cold rolling, then holding in Ar gas at 500° C., 5 sec | No | 8 | 226 |
| Comp. ex. 14 | Cold rolling, then holding in Ar gas at 700° C., 10 sec | No | 5 | 215 |
| Comp. ex. 15 | Cold rolling, then holding in Ar gas at 700° C., 5 min | No | 4 | 125 |
| Comp. ex. 16 | Cold rolling, then holding in Ar gas at 750° C., 30 sec | No | 6 | 114 |
| Comp. ex. 17 | Cold rolling, then holding in Ar gas at 800° C., 1 min | No | 5 | 148 |
| Comp. ex. 18 | Cold rolling, then holding in Ar gas at 850° C., 10 sec | No | 5 | 122 |
| Comp. ex. 19 | Cold rolling, then holding in Ar gas at 850° C., 5 min | No | 6 | 137 |
| Comp. ex. 20 | Cold rolling, then holding in vacuo at 750° C., 30 sec | No | 5 | 153 |
| Comp. ex. 21 | Cold rolling, then holding in He gas at 750° C., 30 sec | No | 7 | 163 |
| Comp. ex. 22 | Cold rolling, then holding in Ar gas at 500° C., 3 sec | Yes | 12 | 25 |
| Comp. ex. 23 | Cold rolling, then holding in Ar gas at 890° C., 30 min | Yes | 9 | 39 |

TABLE 1-1-continued

| | Initial state (before power generation) of titanium material | | | | | | | | | |
|---|---|---|---|---|---|---|---|---|---|---|
| | | Results of XPS analysis of surface | | | | | | | Results of XPS analysis at 10 to 30 nm depth after sputtering titanium material surface with Ar | |
| No. | Depth of TiO$_2$ layer from surface (nm) | C—Ti compounds | N—Ti compounds | TiO or metal Ti | Ratio of matching TiO and metal Ti with peak area (%) | Color of surface | | | C—Ti compounds | N—Ti compounds |
| | | | | | | L* | a* | b* | | |
| Comp. ex. 1 | 5 | No | No | No | 0 | 75.1 | 1.6 | 5.0 | No | No |
| Comp. ex. 2 | 5 | No | No | No | 0 | 65.0 | 1.0 | 3.2 | No | No |
| Comp. ex. 3 | 3 | Yes | No | No | 0 | 71.3 | 0.3 | 4.3 | Yes | No |
| Comp. ex. 4 | 4 | No | No | No | 0 | 75.3 | 1.2 | 4.8 | No | No |
| Comp. ex. 5 | 7 | No | No | No | 0 | 75.6 | 1.6 | 5.4 | No | No |
| Comp. ex. 6 | 7 | No | No | No | 0 | 67.2 | 1.0 | 3.0 | No | No |
| Comp. ex. 7 | 5 | Yes | No | No | 0 | 68.2 | 1.2 | 3.4 | Yes | No |
| Comp. ex. 8 | 6 | Yes | No | No | 0 | 73.2 | 0.5 | 4.9 | Yes | No |
| Comp. ex. 9 | 5 | Yes | No | No | 0 | 76.3 | 0.6 | 4.0 | Yes | No |
| Comp. ex. 10 | 5 | No | No | No | 0 | 75.8 | 1.3 | 4.8 | No | No |
| Comp. ex. 11 | 5 | No | No | No | 0 | 76.9 | 0.9 | 3.5 | No | No |
| Comp. ex. 12 | 12 | Yes | No | No | 0 | 64.3 | −4.5 | 6.0 | Yes | No |
| Comp. ex. 13 | 10 | Yes | No | No | 0 | 64.3 | −4.5 | 6.0 | Yes | No |
| Comp. ex. 14 | 3 | Yes (strong peak) | Yes | No | 0 | 66.2 | −3.3 | 4.5 | Yes (strong peak) | Yes |
| Comp. ex. 15 | 3 | Yes (strong peak) | Yes | No | 0 | 67.2 | −3.0 | 4.2 | Yes (strong peak) | Yes |
| Comp. ex. 16 | 5 | Yes (strong peak) | Yes | No | 0 | 65.5 | −3.3 | 4.7 | Yes (strong peak) | Yes |
| Comp. ex. 17 | 4 | Yes (strong peak) | Yes | No | 0 | 67.3 | −3.2 | 4.1 | Yes (strong peak) | Yes |
| Comp. ex. 18 | 5 | Yes (strong peak) | Yes | No | 0 | 68.5 | −3.1 | 4.3 | Yes (strong peak) | Yes |
| Comp. ex. 19 | 4 | Yes (strong peak) | Yes | No | 0 | 68.6 | −3.0 | 4.4 | Yes (strong peak) | Yes |
| Comp. ex. 20 | 3 | Yes (strong peak) | Yes | No | 0 | 65.2 | −2.4 | 4.0 | Yes (strong peak) | No |
| Comp. ex. 21 | 4 | Yes (strong peak) | Yes | No | 0 | 65.8 | −2.6 | 4.2 | Yes (strong peak) | Yes |
| Comp. ex. 22 | 27 | Yes | No | Yes | 25 | 48.3 | −5.8 | 5.5 | Yes | No |
| Comp. ex. 23 | 29 | Yes | No | Yes | 23 | 65.2 | 1.0 | 4.0 | Yes | No |

1 Nitric/fluoric acid pickling conditions: Immersion in 1% fluoric acid and 10% nitric acid mixed aqueous solution at 50° C. for 2 minutes, then rinsing
2 Nitric acid treatment conditions: Immersion in 30% nitric acid aqueous solution at 80° C. for 5 minutes, then rinsing
3 Cold rolling rate: 50 to 85%

TABLE 1-2

| | | | Contact resistance (mΩ·cm$^2$) | |
|---|---|---|---|---|
| No. | Manufacturing conditions before nitric acid treatment | Nitric acid treatment #2 | Initial | After 5000 hours power generation |
| Inv. ex. 1 | Cold rolling, then holding in Ar gas at 500° C., 5 sec | Yes | 9 | 18 |
| Inv. ex. 2 | Cold rolling, then holding in Ar gas at 700° C., 10 sec | Yes | 6 | 9 |
| Inv. ex. 3 | Cold rolling, then holding in Ar gas at 700° C., 5 min | Yes | 5 | 10 |
| Inv. ex. 4 | Cold rolling, then holding in Ar gas at 750° C., 30 sec | Yes | 5 | 9 |
| Inv. ex. 5 | Cold rolling, then holding in Ar gas at 800° C., 1 min | Yes | 6 | 10 |
| Inv. ex. 6 | Cold rolling, then holding in Ar gas at 850° C., 10 sec | Yes | 4 | 10 |
| Inv. ex. 7 | Cold rolling, then holding in Ar gas at 850° C., 5 min | Yes | 4 | 9 |
| Inv. ex. 8 | Cold rolling, then holding in vacuo at 750° C., 30 sec | Yes | 5 | 9 |

TABLE 1-2-continued

| | | | | |
|---|---|---|---|---|
| Inv. ex. 9 | Cold rolling, then holding in He gas at 750° C., 30 sec | Yes | 6 | 9 |
| Inv. ex. 10 | Cold rolling, then holding in Ar gas at 500° C., 10 min | Yes | 9 | 18 |
| Inv. ex. 11 | Cold rolling, then holding in Ar gas at 600° C., 10 min | Yes | 8 | 16 |
| Inv. ex. 12 | Cold rolling, then holding in Ar gas at 650° C., 5 sec | Yes | 9 | 18 |
| Inv. ex. 13 | Cold rolling, then holding in Ar gas at 750° C., 5 sec | Yes | 5 | 15 |
| Inv. ex. 14 | Cold rolling, then holding in Ar gas at 890° C., 30 sec | Yes | 6 | 16 |
| Inv. ex. 15 | Cold rolling, then holding in Ar gas at 890° C., 10 min | Yes | 6 | 19 |

| | Initial state (before power generation) of titanium material | | | | | | | | |
|---|---|---|---|---|---|---|---|---|---|
| | Depth of $TiO_2$ layer from surface (nm) | C—Ti compounds | N—Ti compounds | TiO or metal Ti | Ratio of matching TiO and metal Ti with peak area (%) | L* | a* | b* | Depth of $TiO_2$ layer from surface (nm) |
| No. | | | | | | | | | C—Ti compounds | N—Ti compounds |

| No. | Depth of $TiO_2$ layer from surface (nm) | C—Ti compounds | N—Ti compounds | TiO or metal Ti | Ratio of matching TiO and metal Ti with peak area (%) | L* | a* | b* | C—Ti compounds | N—Ti compounds |
|---|---|---|---|---|---|---|---|---|---|---|
| Inv. ex. 1 | 20 | No | No | Yes | 17 | 51.2 | −4.6 | 5.5 | Yes | No |
| Inv. ex. 2 | 3 | No | No | Yes | 25 | 55.3 | −3.1 | 4.9 | Yes | Yes |
| Inv. ex. 3 | 4 | No | No | Yes | 28 | 56.0 | −3.0 | 4.5 | Yes | Yes |
| Inv. ex. 4 | 8 | No | No | Yes | 24 | 58.3 | −3.7 | 4.6 | Yes | Yes |
| Inv. ex. 5 | 9 | No | No | Yes | 26 | 59.9 | −3.8 | 4.4 | Yes | Yes |
| Inv. ex. 6 | 8 | No | No | Yes | 35 | 57.9 | −3.2 | 4.3 | Yes | Yes |
| Inv. ex. 7 | 5 | No | No | Yes | 37 | 61.5 | −1.4 | 3.9 | Yes | Yes |
| Inv. ex. 8 | 7 | No | No | Yes | 27 | 58.0 | −3.3 | 4.4 | Yes | No |
| Inv. ex. 9 | 8 | No | No | Yes | 24 | 58.8 | −3.2 | 5.0 | Yes | Yes |
| Inv. ex. 10 | 23 | No | No | Yes | 22 | 52.1 | −4.2 | 5.3 | Yes | No |
| Inv. ex. 11 | 16 | No | No | Yes | 25 | 52.2 | −4.0 | 5.2 | Yes | Yes |
| Inv. ex. 12 | 16 | No | No | Yes | 20 | 52.5 | −4.5 | 5.9 | Yes | Yes |
| Inv. ex. 13 | 13 | No | No | Yes | 24 | 53.2 | −3.5 | 4.8 | Yes | Yes |
| Inv. ex. 14 | 17 | No | No | Yes | 27 | 62.5 | −2.8 | 2.8 | Yes | Yes |
| Inv. ex. 15 | 24 | No | No | Yes | 21 | 62.9 | −1.1 | 2.2 | Yes | No |

1 Nitric/fluoric acid pickling conditions: Immersion in 1% fluoric acid and 10% nitric acid mixed aqueous solution at 50° C. for 2 minutes, then rinsing
2 Nitric acid treatment conditions: Immersion in 30% nitric acid aqueous solution at 80° C. for 5 minutes, then rinsing
3 Cold rolling rate: 50 to 85%

TABLE 2

| No. of Table 1 | Manufacturing conditions before nitric acid treatment | Surface layer structure before nitric acid treatment | | | | | |
|---|---|---|---|---|---|---|---|
| | | Thickness of C rich layer having C concentration of 10 mass % or more (nm) | 10 nm depth from surface | | | Judgment from XPS spectrum | |
| | | | C conc. (mass %) | N conc. (mass %) | C conc. > O conc. #1 | C—Ti compounds | N—Ti compounds |
| Comp. ex. 5 | Nitric/fluoric acid pickling finished material #1 | No | 9 | 3 | Poor | No | No |
| Comp. ex. 6 | Polished material | No | 7 | 3 | Poor | No | No |
| Comp. ex. 7 | Cold rolling, then holding in vacuo at 600° C., 5 hours | No | 6 | 1 | Poor | Yes | No |
| Comp. ex. 8 | Cold rolling, then holding in vacuo at 700° C., 5 hours | No | 4 | 1 | Poor | Yes | No |
| Comp. ex. 9 | Cold rolling, then holding in vacuo at 790° C., 5 hours | No | 3 | 1 | Poor | Yes | No |
| Comp. ex. 10 | Pickling by nitric/fluoric acid, then holding in Ar gas at 750° C., 30 sec | No | 9 | 5 | Poor | No | No |
| Comp. ex. 11 | Pickling by nitric/fluoric acid, then holding in vacuo at 700° C., 5 hours | No | 3 | 3 | Poor | No | No |
| Inv. ex. 1 | Cold rolling, then holding in Ar gas at 500° C., 5 sec | 112 | 40 | 6 | Good | Yes | No |
| Inv. ex. 2 | Cold rolling, then holding in Ar gas at 700° C., 10 sec | 80 | 29 | 7 | Good | Yes (strong peak) | Yes |
| Inv. ex. 3 | Cold rolling, then holding in Ar gas at 700° C., 5 min | 52 | 21 | 14 | Good | Yes (strong peak) | Yes |
| Inv. ex. 4 | Cold rolling, then holding in Ar gas at 750° C., 30 sec | 65 | 26 | 10 | Good | Yes (strong peak) | Yes |
| Inv. ex. 5 | Cold rolling, then holding in Ar gas at 800° C., 1 min | 40 | 19 | 18 | Good | Yes (strong peak) | Yes |
| Inv. ex. 6 | Cold rolling, then holding in Ar gas at 850° C., 10 sec | 51 | 22 | 13 | Good | Yes (strong peak) | Yes |
| Inv. ex. 7 | Cold rolling, then holding in Ar gas at 850° C., 5 min | 24 | 16 | 21 | Good | Yes (strong peak) | Yes |
| Inv. ex. 8 | Cold rolling, then holding in vacuo at 750° C., 30 sec | 68 | 25 | 8 | Good | Yes (strong peak) | Yes |
| Inv. ex. 9 | Cold rolling, then holding in He gas at 750° C., 30 sec | 70 | 24 | 9 | Good | Yes (strong peak) | Yes |
| Inv. ex. 10 | Cold rolling, then holding in Ar gas at 500° C., 10 min | 99 | 37 | 6 | Good | Yes | Yes |
| Inv. ex. 11 | Cold rolling, then holding in Ar gas at 600° C., 10 min | 87 | 36 | 10 | Good | Yes | Yes |
| Inv. ex. 12 | Cold rolling, then holding in Ar gas at 650° C., 5 sec | 104 | 37 | 6 | Good | Yes | Yes |
| Inv. ex. 13 | Cold rolling, then holding in Ar gas at 50° C., 5 sec | 82 | 33 | 10 | Good | Yes (strong peak) | Yes |

TABLE 2-continued

| | | Surface layer structure before nitric acid treatment | | | | | |
|---|---|---|---|---|---|---|---|
| | | Thickness of C rich layer having C concentration of 10 mass % or more (nm) | 10 nm depth from surface | | | Judgment from XPS spectrum | |
| No. of Table 1 | Manufacturing conditions before nitric acid treatment | | C conc. (mass %) | N conc. (mass %) | C conc. > O conc. #1 | C—Ti compounds | N—Ti compounds |
| Inv. ex. 14 | Cold rolling, then holding in Ar gas at 890° C., 30 sec | 15 | 16 | 31 | Poor | Yes (strong peak) | Yes |
| Inv. ex. 15 | Cold rolling, then holding in Ar gas at 890° C., 10 min | 13 | 13 | 26 | Poor | Yes (strong peak) | Yes |

1 Case where C concentration > O concentration expressed as "Good", while case where C concentration ≤ O concentration expressed as "Poor".

TABLE 3

| | | Manufacturing conditions before nitric acid treatment #1 | Conditions of nitric acid treatment (immersion, then rinsing) | | | Contact resistance (mΩ · cm²) | |
|---|---|---|---|---|---|---|---|
| No. | | | Nitric acid conc. (mass %) | Treatment temp. (° C.) | Treatment time (min) | Initial | After 5000 hours power generation |
| Comp. ex. | 24 | A | 10 | 50 | 120 | 5 | 105 |
| Comp. ex. | 25 | A | 10 | 80 | 5 | 5 | 99 |
| Comp. ex. | 26 | A | 10 | 80 | 120 | 5 | 87 |
| Inv. ex. | 16 | A | 15 | 40 | 60 | 5 | 18 |
| Inv. ex. | 17 | A | 15 | 120 | 60 | 5 | 17 |
| Inv. ex. | 18 | A | 30 | 50 | 15 | 6 | 14 |
| Inv. ex. | 19 | A | 30 | 50 | 30 | 5 | 9 |
| Inv. ex. | 20 | A | 30 | 50 | 100 | 5 | 9 |
| Inv. ex. | 21 | A | 30 | 50 | 120 | 6 | 9 |
| Inv. ex. | 22 | A | 30 | 60 | 1 | 6 | 13 |
| Inv. ex. | 23 | A | 30 | 60 | 5 | 6 | 15 |
| Inv. ex. | 24 | A | 30 | 95 | 1 | 6 | 10 |
| Inv. ex. | 25 | A | 30 | 95 | 5 | 6 | 9 |
| Inv. ex. | 26 | A | 30 | 95 | 15 | 5 | 9 |
| Inv. ex. | 27 | A | 30 | 115 | 1 | 5 | 9 |
| Inv. ex. | 28 | A | 30 | 115 | 15 | 5 | 9 |
| Inv. ex. | 29 | A | 50 | 50 | 15 | 5 | 9 |
| Inv. ex. | 30 | A | 59 | 60 | 0.1 | 6 | 10 |
| Inv. ex. | 31 | A | 59 | 60 | 5 | 5 | 9 |
| Inv. ex. | 32 | B | 30 | 50 | 15 | 6 | 13 |
| Inv. ex. | 33 | B | 30 | 50 | 100 | 6 | 9 |
| Inv. ex. | 34 | B | 30 | 95 | 1 | 6 | 9 |
| Inv. ex. | 35 | B | 30 | 95 | 5 | 5 | 8 |
| Inv. ex. | 36 | B | 50 | 50 | 15 | 5 | 8 |
| Inv. ex. | 37 | C | 30 | 50 | 15 | 5 | 14 |
| Inv. ex. | 38 | C | 30 | 50 | 100 | 5 | 9 |
| Inv. ex. | 39 | C | 30 | 95 | 1 | 5 | 10 |
| Inv. ex. | 40 | C | 30 | 95 | 5 | 6 | 8 |
| Inv. ex. | 41 | C | 50 | 50 | 15 | 6 | 9 |

| | | Initial state (before power generation) of titanium material | | | | | | | | |
|---|---|---|---|---|---|---|---|---|---|---|
| | | Results of XPS analysis of surface | | | | | | | Results of XPS analysis at 10 to 30 nm depth after sputtering titanium material surface with Ar | |
| | | Depth of TiO₂ layer from surface (nm) | C—Ti compounds | N—Ti compounds | TiO or metal Ti | Ratio of matching TiO and metal Ti with peak area (%) | Color of surface | | | |
| No. | | | | | | | L* | a* | b* | C—Ti compounds | N—Ti compounds |
| Comp. ex. | 24 | 5 | Yes | No | Yes | 13 | 65.4 | −3.3 | 4.5 | Yes | No |
| Comp. ex. | 25 | 5 | Yes | No | Yes | 15 | 65.3 | −3.2 | 4.6 | Yes | No |

TABLE 3-continued

| | No. | | | | | | | | | | |
|---|---|---|---|---|---|---|---|---|---|---|---|
| Comp. ex. | 26 | 5 | Yes | No | Yes | 16 | 65.0 | −3.4 | 4.7 | Yes | No |
| Inv. ex. | 16 | 6 | No | No | Yes | 17 | 62.2 | −3.5 | 4.5 | Yes | Yes |
| Inv. ex. | 17 | 7 | No | No | Yes | 18 | 61.9 | −3.7 | 4.4 | Yes | Yes |
| Inv. ex. | 18 | 7 | No | No | Yes | 19 | 60.2 | −3.7 | 4.3 | Yes | Yes |
| Inv. ex. | 19 | 7 | No | No | Yes | 20 | 60.0 | −3.8 | 4.4 | Yes | Yes |
| Inv. ex. | 20 | 8 | No | No | Yes | 25 | 59.0 | −3.7 | 4.3 | Yes | Yes |
| Inv. ex. | 21 | 8 | No | No | Yes | 25 | 58.8 | −3.8 | 4.2 | Yes | Yes |
| Inv. ex. | 22 | 6 | No | No | Yes | 16 | 61.1 | −3.9 | 4.3 | Yes | Yes |
| Inv. ex. | 23 | 6 | No | No | Yes | 17 | 59.9 | −3.9 | 4.3 | Yes | Yes |
| Inv. ex. | 24 | 7 | No | No | Yes | 20 | 59.8 | −3.9 | 4.4 | Yes | Yes |
| Inv. ex. | 25 | 8 | No | No | Yes | 25 | 59.2 | −3.8 | 4.4 | Yes | Yes |
| Inv. ex. | 26 | 9 | No | No | Yes | 26 | 58.9 | −3.7 | 4.3 | Yes | Yes |
| Inv. ex. | 27 | 8 | No | No | Yes | 24 | 58.3 | −3.9 | 4.5 | Yes | Yes |
| Inv. ex. | 28 | 9 | No | No | Yes | 25 | 58.0 | −3.8 | 4.5 | Yes | Yes |
| Inv. ex. | 29 | 8 | No | No | Yes | 24 | 58.2 | −3.8 | 4.5 | Yes | Yes |
| Inv. ex. | 30 | 8 | No | No | Yes | 20 | 59.5 | −3.5 | 4.5 | Yes | Yes |
| Inv. ex. | 31 | 8 | No | No | Yes | 25 | 58.8 | −3.6 | 4.3 | Yes | Yes |
| Inv. ex. | 32 | 7 | No | No | Yes | 20 | 60.1 | −3.7 | 4.4 | Yes | Yes |
| Inv. ex. | 33 | 8 | No | No | Yes | 25 | 59.1 | −3.7 | 4.3 | Yes | Yes |
| Inv. ex. | 34 | 7 | No | No | Yes | 21 | 59.7 | −3.8 | 4.4 | Yes | Yes |
| Inv. ex. | 35 | 8 | No | No | Yes | 26 | 58.5 | −3.8 | 4.4 | Yes | Yes |
| Inv. ex. | 36 | 8 | No | No | Yes | 23 | 58.4 | −3.8 | 4.4 | Yes | Yes |
| Inv. ex. | 37 | 7 | No | No | Yes | 19 | 60.0 | −3.8 | 4.3 | Yes | No |
| Inv. ex. | 38 | 8 | No | No | Yes | 24 | 59.0 | −3.7 | 4.3 | Yes | No |
| Inv. ex. | 39 | 8 | No | No | Yes | 20 | 59.7 | −3.7 | 4.3 | Yes | No |
| Inv. ex. | 40 | 8 | No | No | Yes | 25 | 58.6 | −3.7 | 4.3 | Yes | No |
| Inv. ex. | 41 | 8 | No | No | Yes | 24 | 58.5 | −3.7 | 4.4 | Yes | No |

1 Manufacturing conditions before nitric acid treatment

A: Cold rolling, then holding in Ar gas at 750° C. for 30 seconds

B: Cold rolling, then holding in Ar gas at 800° C. for 1 minutes

C: Cold rolling, then holding in vacuo at 750° C. for 30 seconds

Note that the cold rolling was 50 to 85%

TABLE 4

| | No. | Manufacturing conditions before chromic acid treatment #1 | Conditions of chromic acid treatment (immersion, then rinsing) | | | | Contact resistance (mΩ · cm$^2$) | |
|---|---|---|---|---|---|---|---|---|
| | | | $Cr^{+6}$ ion conc. (g/l) | Sulfuric acid conc. (g/l) | Treatment temp. (° C.) | Treatment time (min) | Initial | After 5000 hours power generation |
| Comp. ex. | 27 | A | 5 | 30 | 100 | 15 | 5 | 110 |
| Comp. ex. | 28 | A | 5 | 100 | 100 | 15 | 5 | 109 |
| Comp. ex. | 29 | A | 5 | 100 | 100 | 60 | 5 | 101 |
| Inv. ex. | 42 | A | 10 | 50 | 50 | 15 | 5 | 19 |
| Inv. ex. | 43 | A | 20 | 70 | 80 | 15 | 5 | 15 |
| Inv. ex. | 44 | A | 30 | 100 | 50 | 15 | 6 | 14 |
| Inv. ex. | 45 | A | 30 | 100 | 80 | 15 | 5 | 15 |
| Inv. ex. | 46 | A | 30 | 100 | 100 | 15 | 5 | 10 |
| Inv. ex. | 47 | A | 30 | 100 | 110 | 15 | 6 | 10 |
| Inv. ex. | 48 | A | 30 | 100 | 100 | 0.5 | 6 | 16 |
| Inv. ex. | 49 | A | 30 | 100 | 100 | 5 | 6 | 11 |
| Inv. ex. | 50 | A | 30 | 100 | 100 | 30 | 6 | 9 |
| Inv. ex. | 51 | A | 30 | 100 | 100 | 60 | 6 | 9 |
| Inv. ex. | 52 | A | 50 | 100 | 100 | 15 | 5 | 9 |
| Inv. ex. | 53 | A | 80 | 100 | 50 | 15 | 5 | 10 |
| Inv. ex. | 54 | A | 100 | 200 | 50 | 15 | 5 | 10 |
| Inv. ex. | 55 | B | 20 | 70 | 80 | 15 | 5 | 15 |
| Inv. ex. | 56 | B | 30 | 100 | 100 | 5 | 5 | 12 |
| Inv. ex. | 57 | B | 30 | 100 | 100 | 15 | 5 | 10 |
| Inv. ex. | 58 | B | 30 | 100 | 100 | 30 | 6 | 9 |
| Inv. ex. | 59 | B | 50 | 100 | 100 | 15 | 6 | 9 |

TABLE 4-continued

Initial state (before power generation) of titanium material

| | Depth of TiO$_2$ layer from surface (nm) | Result of XPS analysis of surface | | | | Color of surface | | | Results of XPS analysis at 10 to 30 nm depth after sputtering titanium material surface with Ar | |
|---|---|---|---|---|---|---|---|---|---|---|
| No. | | C—Ti compounds | N—Ti compounds | TiO or metal Ti | Ratio of matching TiO and metal Ti with peak area (%) | L* | a* | b* | C—Ti compounds | N—Ti compounds |
| Comp. ex. 27 | 5 | Yes | Yes | Yes | 5 | 65.5 | −3.4 | 4.5 | Yes | Yes |
| Comp. ex. 28 | 5 | Yes | Yes | Yes | 7 | 65.2 | −3.3 | 4.6 | Yes | Yes |
| Comp. ex. 29 | 5 | Yes | No | Yes | 8 | 65.2 | −3.5 | 4.7 | Yes | No |
| Inv. ex. 42 | 5 | No | No | Yes | 15 | 62.2 | −3.5 | 4.5 | Yes | Yes |
| Inv. ex. 43 | 7 | No | No | Yes | 19 | 61.0 | −3.6 | 4.5 | Yes | Yes |
| Inv. ex. 44 | 6 | No | No | Yes | 18 | 59.9 | −3.8 | 4.3 | Yes | Yes |
| Inv. ex. 45 | 7 | No | No | Yes | 21 | 59.5 | −3.8 | 4.4 | Yes | Yes |
| Inv. ex. 46 | 8 | No | No | Yes | 25 | 59.0 | −3.8 | 4.4 | Yes | Yes |
| Inv. ex. 47 | 8 | No | No | Yes | 25 | 58.9 | −3.7 | 4.4 | Yes | Yes |
| Inv. ex. 48 | 6 | No | No | Yes | 20 | 60.8 | −3.8 | 4.3 | Yes | Yes |
| Inv. ex. 49 | 7 | No | No | Yes | 26 | 58.2 | −3.9 | 4.4 | Yes | Yes |
| Inv. ex. 50 | 8 | No | No | Yes | 25 | 58.3 | −3.9 | 4.3 | Yes | Yes |
| Inv. ex. 51 | 8 | No | No | Yes | 25 | 58.9 | −3.9 | 4.3 | Yes | Yes |
| Inv. ex. 52 | 9 | No | No | Yes | 26 | 58.5 | −3.7 | 4.3 | Yes | Yes |
| Inv. ex. 53 | 8 | No | No | Yes | 22 | 59.2 | −3.9 | 4.4 | Yes | Yes |
| Inv. ex. 54 | 9 | No | No | Yes | 24 | 59.0 | −3.9 | 4.5 | Yes | Yes |
| Inv. ex. 55 | 8 | No | No | Yes | 19 | 60.8 | −3.8 | 4.3 | Yes | Yes |
| Inv. ex. 56 | 8 | No | No | Yes | 24 | 59.0 | −3.8 | 4.4 | Yes | Yes |
| Inv. ex. 57 | 8 | No | No | Yes | 25 | 59.2 | −3.6 | 4.4 | Yes | Yes |
| Inv. ex. 58 | 9 | No | No | Yes | 24 | 59.3 | −3.7 | 4.4 | Yes | Yes |
| Inv. ex. 59 | 8 | No | No | Yes | 24 | 58.8 | −3.7 | 4.4 | Yes | Yes |

1 Manufacturing conditions before chrome treatment
A: Cold rolling, then holding in Ar gas at 750° C. for 30 seconds
B: Cold rolling, then holding in Ar gas at 800° C. for 1 minutes
Note that the cold rolling rate was 50 to 85%

Invention Examples 1 to 59 of Table 1-2, Table 3, and Table 4 where the structures of the surfaces and directly below the surfaces (surface layer structures) of the titanium materials are in the range the present invention all had initial contact resistances of less than 10 mΩ·cm$^2$ and also had contact resistances after 5000 hours power generation maintained at low values of less than 20 mΩ·cm$^2$. Invention Examples 2 to 9 and Invention Example 13 which are in the preferable range of the present invention had contact resistances after 5000 hours power generation of further lower 15 mΩ·cm$^2$ or less.

Comparative Examples 1 to 4 and Comparative Examples 12 to 21 which are not subjected to the predetermined nitric acid treatment had structures of the surfaces and directly below the surfaces (surface layer structures) of the titanium materials outside the range of the present invention, Comparative Examples 1 to 4 had initial contact resistances themselves of high 60 mΩ·cm$^2$ or more, and Comparative Examples 12 to 21 had contact resistances greatly increasing after 5000 hours power generation and ending up exceeding 100 mΩ·cm$^2$ due to the effects of the Ti compounds containing C and N.

Further, Comparative Examples 5 to 11, Comparative Example 22, and Comparative Example 23 where, even if subjected to the predetermined nitric acid treatment, the surfaces before the nitric acid treatment were not in the range of the present invention, had initial contact resistances or contact resistances after 5000 hours power generation which were high. Comparative Example 22 had an annealing temperature in an Ar atmosphere of a low 500° C. and a time of a short 3 seconds, so it is conceivable that the residual oil film of the cold rolling inhibited the reaction at the time of the nitric acid treatment and therefore the C—Ti compounds could not be completely removed. Further, Comparative Example 23 was heated at a high temperature of 890° C. for 30 minutes, so it is conceivable that the C—Ti compounds were formed to deep inside and could not be completely removed even by nitric acid treatment.

Comparative Examples 13 to 21 subjected to nitric acid treatment correspond to Invention Examples 1 to 9. If looking at the change in color, all fell in L*. The color was in the range of claim 4. On the other hand, Comparative Example 1 to 4 subjected to nitric acid treatment correspond to Comparative Examples 5, 6, 8, and 10. All had surfaces before nitric acid treatment outside the range of the present invention (see Table 2) and rose in L* due to nitric acid treatment.

EXAMPLE 2

Claims 6 to 9 of the method of production of the present invention will be explained in further detail below using the following examples.

From Table 2, the surfaces before nitric acid treatment of Comparative Examples 5 to 11 of Table 1-1 had C concentrations at positions of a depth of 10 nm of a low 9 mass %. As a result, as shown in Table 1-1, the structure of the surface and directly below the surface (surface layer structure) the present invention could not be obtained. On the other hand, the surfaces before nitric acid treatment of Invention Examples 1 to 11 of Table 1-2 had C concentrations, N concentrations, presences of C—Ti compounds and N—Ti compounds, etc. in the range of the present invention. As a result, as shown in Table 1-2, the structure of the surface and directly below the surface (surface layer structure) the present invention could be obtained. In the above way, the surface before nitric acid treatment of the present invention, in particular the structure of the C rich layer, is important.

Further, from Table 2, Invention Examples 1 to 15 perform heat treatment after cold rolling and have conditions within the range of claim 9. It is learned that performing predetermined heat treatment after cold rolling is important.

From Table 3, it is learned that, regarding the conditions of the nitric acid treatment as well, in the range of the present invention, the structure of the surface and directly below the surface (surface layer structure) of the present invention is suitably obtained and as a result a low contact resistance is maintained.

EXAMPLE 3

Claim 10 of the present invention will be explained in further detail below using the following examples.

From Table 4, it is learned that, regarding the conditions of the chromic acid treatment as well, in the range of the present invention, the structure of the surface and directly below the surface (surface layer structure) of the present invention is suitably obtained and as a result a low contact resistance is maintained.

EXAMPLE 4

Table 5 shows examples of industrial use pure titanium of JIS Type 2, JIS Type 4, and Ti-1 mass % Cu and Ti-3 mass % Al-2.5 mass % V classified as titanium alloys. In each case, the structure at the surface and directly below the surface (surface layer structure) was in the range of claims 1 to 4 of the present invention and the contact resistance before and after 5000 hours of power generation was a low value.

TABLE 5

| No. | Type of titanium | Manufacturing conditions before sulfuric acid treatment or before chromic acid treatment #1 | Conditions of sulfuric acid treatment or chromic acid treatment #2 | Contact resistance (mΩ·cm²) | |
|---|---|---|---|---|---|
| | | | | Initial | After 5000 hours power generation |
| Inv. ex. 60 | Pure titanium JIS Type 2 | A | A (Nitric acid, immersion) | 5 | 9 |
| Inv. ex. 61 | Pure titanium JIS Type 4 | A | A (Nitric acid, immersion) | 6 | 11 |
| Inv. ex. 62 | Ti-1 mass % Cu | A | A (Nitric acid, immersion) | 6 | 11 |
| Inv. ex. 63 | Ti-3 mass % Al-2.5 mass % V | A | A (Nitric acid, immersion) | 6 | 11 |
| Inv. ex. 64 | Pure titanium JIS Type 1 | A | B (Nitric acid, coating) | 5 | 10 |
| Inv. ex. 65 | Pure titanium JIS Type 1 | B | B (Nitric acid, coating) | 5 | 9 |
| Inv. ex. 66 | Pure titanium JIS Type 1 | C | B (Nitric acid, coating) | 5 | 10 |
| Inv. ex. 67 | Pure titanium JIS Type 1 | A | C (Chromic acid, coating) | 5 | 10 |
| Inv. ex. 68 | Pure titanium JIS Type 1 | B | C (Chromic acid, coating) | 5 | 10 |
| Inv. ex. 69 | Pure titanium JIS Type 1 | C | C (Chromic acid, coating) | 6 | 11 |

| | Initial state (before power generation) of titanium material | | | | | | | | |
|---|---|---|---|---|---|---|---|---|---|
| | Depth of $TiO_2$ layer from surface | Results of XPS analysis of surface | | | | | | Results of XPS analysis at 10 to 30 nm depth after sputtering titanium material surface with Ar | |
| No. | (nm) | C—Ti compounds | N—Ti compounds | TiO or metal Ti | Ratio of matching TiO and metal Ti with peak area (%) | Color of surface | | C—Ti compounds | N—Ti compounds |
| | | | | | | L* | a* | b* | | |
| Inv. ex. 60 | 5 | No | No | Yes | 24 | 58.5 | −3.5 | 4.5 | Yes | Yes |
| Inv. ex. 61 | 4 | No | No | Yes | 25 | 58.6 | −3.6 | 4.6 | Yes | Yes |
| Inv. ex. 62 | 5 | No | No | Yes | 23 | 58.9 | −3.5 | 4.5 | Yes | Yes |
| Inv. ex. 63 | 5 | No | No | Yes | 23 | 58.7 | −3.7 | 4.6 | Yes | Yes |

TABLE 5-continued

| Inv. ex. 64 | 5 | No | No | Yes | 25 | 58.4 | −3.7 | 4.5 | Yes | Yes |
|---|---|---|---|---|---|---|---|---|---|---|
| Inv. ex. 65 | 9 | No | No | Yes | 25 | 59.7 | −3.7 | 4.4 | Yes | Yes |
| Inv. ex. 66 | 8 | No | No | Yes | 28 | 58.0 | −3.4 | 4.4 | Yes | No |
| Inv. ex. 67 | 8 | No | No | Yes | 24 | 59.0 | −3.7 | 4.5 | Yes | Yes |
| Inv. ex. 68 | 8 | No | No | Yes | 25 | 59.4 | −3.5 | 4.4 | Yes | Yes |
| Inv. ex. 69 | 8 | No | No | Yes | 24 | 59.0 | −3.6 | 4.4 | Yes | No |

1 Manufacturing conditions before sulfuric acid treatment or before chromic acid treatment
A: Cold rolling, then holding in Ar gas at 750° C. for 30 seconds
B: Cold rolling, then holding in Ar gas at 800° C. for 1 minutes
C: Cold rolling, then holding in vacuo at 750° C. for 30 seconds
Note that the cold rolling rate was 50 to 85%
2 Conditions of sulfuric acid treatment or chromic acid treatment
A: Immersion in 30% nitric acid aqueous solution at 80° C. for 5 minutes, then rinsing
B: Coating by 30% nitric acid aqueous solution at 80° C. for 5 minutes, then rinsing
C: Immersion in 100 g/l sulfuric acid aqueous solution containing 30 g/l of Cr+6 ions at 100° C. for 15 minutes, then rinsing Further, in the above Example 1, Example 2, and Example 3, examples were shown of nitric acid treatment or chromic acid treatment by immersion, but, as shown in Table 5, it is learned that similar effects can be obtained even in the case of coating.

Note that, the structures of the surface and directly under the surface of the titanium material shown in Table 1-1, Table 1-2, Table 3, Table 4, and Table 5 (surface layer structure) are the results of analysis by XPS. Further, in Table 2, the presence of any C—Ti compounds and N—Ti compounds is the result of analysis by XPS, while the thickness of the C rich layer and the comparison with the C concentration, N concentration, and O concentration are the results of analysis by GDS.

EXAMPLE 5

Claim 2 of the present invention will be explained in further detail using the following examples.

Table 6 shows the C—Ti compounds and N—Ti compounds identified by electron diffraction analysis as a result of TEM observation of the cross-section of the surface layer of the titanium material. Note that, Table 6 shows this for Comparative Examples 1, 3, 5, and 8 (described in Table 1-1), Invention Examples 4, 5, 6, 8, and 10 (described in Table 1-2), Invention Examples 24, 29, 34, 39, and 41 (described in Table 3), Invention Examples 46 and 57 (described in Table 4), and Invention Examples 60, 61, 62, and 63 (described in Table 5).

The method of preparation of the TEM observation samples and the method of TEM observation were as follows: The FIB (focused ion beam) method using a Ga ion beam was used to work a thin film sample of a cross-section including the surface to a thickness of 0.1 μm which was then used as a TEM observation sample. For the TEM observation, a 200 kV field emission type transmission electron microscope was used. Qualitative analysis by EDS (energy-dispersive X-ray spectroscopy) analysis and electron diffraction analysis were performed to identify the compounds in the observed fields.

TABLE 6

| No. | Reference table | C—Ti compound and N—Ti compound identified by electron diffraction analysis by TEM observation of cross-section of surface layer of titanium material |
|---|---|---|
| Comp. ex. 1 | Table 1-1 | C—Ti and N—Ti compounds both not observed |
| Comp. ex. 3 | Table 1-1 | TiC |
| Comp. ex. 5 | Table 1-1 | C—Ti and N—Ti compounds both not observed |
| Comp. ex. 8 | Table 1-1 | TiC |
| Inv. ex. 4 | Table 1-2 | TiC, $TiN_{0.3}$ |
| Inv. ex. 5 | Table 1-2 | TiC, $TiN_{0.3}$ |
| Inv. ex. 6 | Table 1-2 | TiC, $TiN_{0.3}$ |
| Inv. ex. 8 | Table 1-2 | TiC |
| Inv. ex. 10 | Table 1-2 | TiC |
| Inv. ex. 24 | Table 3 | TiC, $TiN_{0.3}$ |
| Inv. ex. 29 | Table 3 | TiC, $TiN_{0.3}$ |
| Inv. ex. 34 | Table 3 | TiC, $TiN_{0.3}$ |
| Inv. ex. 39 | Table 3 | TiC |
| Inv. ex. 41 | Table 3 | TiC |
| Inv. ex. 46 | Table 4 | TiC, $TiN_{0.3}$ |
| Inv. ex. 57 | Table 4 | TiC, $TiN_{0.3}$ |
| Inv. ex. 60 | Table 5 | TiC, $TiN_{0.3}$ |
| Inv. ex. 61 | Table 5 | TiC, $TiN_{0.3}$ |
| Inv. ex. 62 | Table 5 | TiC, $TiN_{0.3}$ |
| Inv. ex. 63 | Table 5 | TiC, $TiN_{0.3}$ |

In the invention examples shown in the reference tables in Table 6, electron diffraction analysis identified the compounds as TiC or TiC and $TiN_{0.3}$. From these results, it is learned that the Ti compound including either of C and N directly under the titanium material surface of the present invention includes, as a component phase, TiC or TiC band $TiN_{0.3}$.

On the other hand, Comparative Example 1 which was nitric/fluoric acid pickling finished and Comparative Example 5 which was then subjected to nitric acid treatment both did not reveal C—Ti compounds or N—Ti compounds. Further, in both Comparative Example 3 which was cold rolled, then held in a vacuum at 700° C. for 5 hours and Comparative Example 8 which was then subjected to nitric acid treatment revealed TiC, as shown in Table 1-1, even by XPS of the titanium material surface, C—Ti compounds were detected. The structures of the titanium material surface and directly below the surface (surface layer structure) were outside the range of the present invention.

| Reference Signs List | |
|---|---|
| 1 | solid polymer fuel cell |
| 2 | solid polymer membrane |
| 3 | catalyst electrode part |
| 4 | carbon paper |
| 5 | separator |
| 6 | anode side separator |

| Reference Signs List | |
|---|---|
| 7 | cathode side separator |
| 8 | hydrogen gas |
| 9 | air |
| 10 | electrons |
| 11 | Ti compound including either of C and N |
| 12 | titanium oxide |
| 13 | metal Ti |

The invention claimed is:

1. A titanium material for a solid polymer fuel cell separator having a low contact resistance which has at its surface a surface layer structure in which a Ti compound containing either C or N is dispersed, said Ti compound being covered by titanium oxide, or metal Ti, or titanium oxide and metal Ti, said titanium material characterized in that,
when analyzed from the titanium material surface by XPS (X-ray photoelectron spectroscopy),
a Ti2p spectrum of $TiO_2$ is detected,
further,
at a Ti2p spectral energy range of 454.2 eV to 455.1 eV of TiO, or a Ti2p spectral energy range of 453.7 eV to 453.9 eV of metal Ti, or a Ti2p spectral energy range of 454.2 eV to 455.1 eV of TiO and a Ti2p spectral energy range of 453.7 eV to 453.9 eV of metal Ti, a Ti2p spectrum of TiO, or a Ti2p spectrum of metal, or a Ti2p spectrum of TiO and a Ti2p spectrum of metal Ti having a Ti maximum detection peak height (c/s) of at least 3 times the standard deviations of the backgrounds (c/s) at the respective spectral energy ranges is detected, and
at a C1s spectral energy range of 280 to 283 eV and N1s spectral energy range of 394 to 398 eV, a spectrum of C1s and a spectrum of N1s having a maximum detection peak height (c/s) of less than 3 times the standard deviations of the backgrounds (c/s) at the respective spectral energy ranges of C1s and N1s are detected,
where the background (c/s) at each spectral energy range is measured by removing the surface layer part of said titanium material having that structure and exposing the titanium material at the base.

2. A titanium material for a solid polymer fuel cell separator having a low contact resistance as set forth in claim 1, characterized in that said Ti compound containing either C or N contains, as a component phase, TiC or TiC and $TiN_{0.3}$.

3. A titanium material for a solid polymer fuel cell separator having a low contact resistance as set forth in claim 1, characterized in that X-ray photoelectron spectroscopy is used to separate the peaks of the Ti2p photoelectron spectrum obtained from the surface of the titanium material and find the areas of the peaks of the $TiO_2$, $Ti_2O_3$, TiO, and metal Ti and in that the ratios of the sum of the areas of the peaks of TiO and metal Ti to the total sum of these areas is 15 to 40%.

4. A titanium material for a solid polymer fuel cell separator having a low contact resistance as set forth in claim 1, characterized in that the color of the titanium material surface is, by L*a*b* color scale, L*: 50 to 63, a*: −5 to −1, and b*: 2 to 6.

5. A titanium material for a solid polymer fuel cell separator having a low contact resistance as set forth in any one of claim 1, characterized in that the titanium material is industrial use pure titanium of JIS Type 1.

6. A method of production of a titanium material for a solid polymer fuel cell separator having a low contact resistance as set forth in claim 1, characterized by immersing a titanium material, having a C concentration of 10 to 40 mass % at a position of a depth of 10 nm from the surface and having a Ti compound containing C, in a nitric acid aqueous solution having a concentration of 15 to 59 mass % and a temperature of 40 to 120° C. for 5 seconds to 120 minutes or by coating said titanium material with said nitric acid aqueous solution, then washing it.

7. A method of production of a titanium material for a solid polymer fuel cell separator having a low contact resistance as set forth in claim 6, characterized in that said titanium material is a titanium material having a C concentration higher than an O concentration to a depth of 10 nm from the surface.

8. A method of production of a titanium material for a solid polymer fuel cell separator having a low contact resistance as set forth in claim 1, characterized by immersing a titanium material, having a C concentration of 10 to 40 mass % and an N concentration of 5 to 35 mass % at a position of a depth of 10 nm from the surface and having a Ti compound containing either C or N, in a nitric acid aqueous solution having a concentration of 15 to 59 mass % and a temperature of 40 to 120° C. for 5 seconds to 120 minutes or by coating said titanium material with said nitric acid aqueous solution, then washing it.

9. A method of production of a titanium material for a solid polymer fuel cell separator having a low contact resistance as set forth in claim 1, characterized by cold rolling the titanium material using a lubricant containing C, then heat treating it in an inert gas atmosphere or vacuum atmosphere at 500 to 890° C. for 5 seconds to 10 minutes, then immersing it in a nitric acid aqueous solution having a concentration of 15 to 59 mass % and a temperature of 40 to 120° C. for 5 seconds to 120 minutes or coating said titanium material with said nitric acid aqueous solution, then washing it.

10. A method of production of a titanium material for a solid polymer fuel cell separator having a low contact resistance as set forth in claim 1, characterized by immersing a titanium material, having a C concentration of 10 to 40 mass % at a position of a depth of 10 nm from the surface and having a Ti compound containing C, in a 50 to 300 g/l sulfuric acid aqueous solution containing 10 to 100 g/l of $Cr^{6+}$ ions at a temperature of 50° C. to the boiling point for 30 seconds to 60 minutes or by coating said titanium material with said sulfuric acid aqueous solution, then washing it.

11. A method of production of a titanium material for a solid polymer fuel cell separator having a low contact resistance as set forth in claim 10, characterized in that said titanium material is a titanium material having a C concentration higher than an O concentration to a depth of 10 nm from the surface.

12. A method of production of a titanium material for a solid polymer fuel cell separator having a low contact resistance as set forth in claim 1, characterized by immersing a titanium material, having a C concentration of 10 to 40 mass % and an N concentration of 5 to 35 mass % at a position of a depth of 10 nm from the surface and having a Ti compound containing either C or N, in a 50 to 300 g/l sulfuric acid aqueous solution containing 10 to 100 g/l of $Cr^{6+}$ ions at a temperature of 50° C. to the boiling point for 30 seconds to 60 minutes or by coating said titanium material with said sulfuric acid aqueous solution, then washing it.

13. A method of production of a titanium material for a solid polymer fuel cell separator having a low contact resistance as set forth in claim 1, characterized by cold rolling the titanium material using a lubricant containing C, then heat treating it in an inert gas atmosphere or vacuum atmosphere at 500 to 890° C. for 5 seconds to 10 minutes, then immersing it in a 50 to 300 g/l sulfuric acid aqueous solution containing 10 to 100 g/l of $Cr^{6+}$ ions at a temperature of 50° C. to the boiling point for 30 seconds to 60 minutes or by coating said titanium material with said sulfuric acid aqueous solution, then washing it.

* * * * *

UNITED STATES PATENT AND TRADEMARK OFFICE
CERTIFICATE OF CORRECTION

PATENT NO. : 8,603,268 B2　　　　　　　　　　　　　　　　　　　　　　　　Page 1 of 1
APPLICATION NO. : 12/998214
DATED : December 10, 2013
INVENTOR(S) : Kazuhiro Takahashi et al.

It is certified that error appears in the above-identified patent and that said Letters Patent is hereby corrected as shown below:

In the Specification

Column 6, line 67, change "the'titanium" to -- the titanium --;

Column 9, line 15, change "is made a titanium" to -- is made of a titanium --;

Column 9, line 18, change "is made one" to -- is made of one --;

Column 9, line 21, change "is made the titanium" to -- is made of the titanium --;

Column 9, line 66, change "The is peak" to -- The ls peak --;

Column 11, line 29, change "is made one" to -- is made of one --.

Signed and Sealed this
Twelfth Day of August, 2014

Michelle K. Lee
*Deputy Director of the United States Patent and Trademark Office*